(12) United States Patent
Lee

(10) Patent No.: US 12,675,032 B2
(45) Date of Patent: Jul. 7, 2026

(54) PORTABLE COUNTING APPARATUS FOR SMART CITY IMPLEMENTATION USING ARTIFICIAL INTELLIGENCE

(71) Applicant: KIOT Ltd., Daegu (KR)

(72) Inventor: Jae Joon Lee, Seoul (KR)

(73) Assignee: KIOT Ltd., Daegu (KR)

( * ) Notice: Subject to any disclaimer, the term of this patent is extended or adjusted under 35 U.S.C. 154(b) by 157 days.

(21) Appl. No.: 18/615,478

(22) Filed: Mar. 25, 2024

(65) Prior Publication Data

US 2025/0298294 A1      Sep. 25, 2025

(51) Int. Cl.
G03B 17/56        (2021.01)
G06T 7/70          (2017.01)
G06V 10/25        (2022.01)

(52) U.S. Cl.
CPC .............. *G03B 17/561* (2013.01); *G06T 7/70* (2017.01); *G06V 10/25* (2022.01); *G03B 2217/002* (2013.01); *G03B 2217/007* (2013.01); *G06T 2207/30242* (2013.01)

(58) Field of Classification Search
None
See application file for complete search history.

(56) References Cited

U.S. PATENT DOCUMENTS

| | | | |
|---|---|---|---|
| 10,248,870 B2 * | 4/2019 | Ding ...................... | G06V 10/25 |
| 2005/0151846 A1 * | 7/2005 | Thornhill ................. | H04N 5/76 |
| | | | 348/149 |
| 2009/0086043 A1 * | 4/2009 | Scheucher ............ | H02J 7/0063 |
| | | | 348/E5.042 |

(Continued)

FOREIGN PATENT DOCUMENTS

| | | | | |
|---|---|---|---|---|
| CN | 205719055 U | * | 11/2016 | |
| CN | 107886454 A | * | 4/2018 | ............. G06Q 50/26 |

(Continued)

*Primary Examiner* — Rodney E Fuller
(74) *Attorney, Agent, or Firm* — STIP Law Group, LLC

(57) ABSTRACT

Portable counting apparatus for smart city implementation using artificial intelligence, the apparatus comprising: a tripod; a camera module disposed on the tripod and takes images of a region of interest; a driver counting number of an objects corresponding to the region of interest by analyzing the image of the region of interest; a communicating module transmitting information of the number of the object corresponding to the region of interest to a server; a power supplying part supplying a power to at least one of the camera module, the driver and the communicating module; and a case part, wherein the power supplying part includes a solar cell part producing power using solar energy; and a battery storing the power produced by the solar cell part, wherein the case part includes a space inside to accommodate at least one of the battery and the driver, wherein the tripod includes a pillar part including a portion extended along a vertical direction; a mounting part located on a top of the pillar part; and a plate part including a hole through which the pillar part passes; wherein the camera module is disposed on the mounting part, wherein the plate part is located below the mounting part, wherein the communicating module is disposed on the plate part.

5 Claims, 49 Drawing Sheets

(56) References Cited

U.S. PATENT DOCUMENTS

| | | | | |
|---|---|---|---|---|
| 2010/0166412 A1* | 7/2010 | Rix | ........................ | G03B 17/00 |
| | | | | 396/427 |
| 2016/0144233 A1* | 5/2016 | Welker | ............... | H05K 7/20009 |
| | | | | 700/91 |
| 2019/0205659 A1* | 7/2019 | Cuban | .................... | G06V 20/41 |

FOREIGN PATENT DOCUMENTS

| | | | | |
|---|---|---|---|---|
| CN | 207867058 U | * | 9/2018 | |
| JP | 3185350 U | * | 8/2013 | |

* cited by examiner

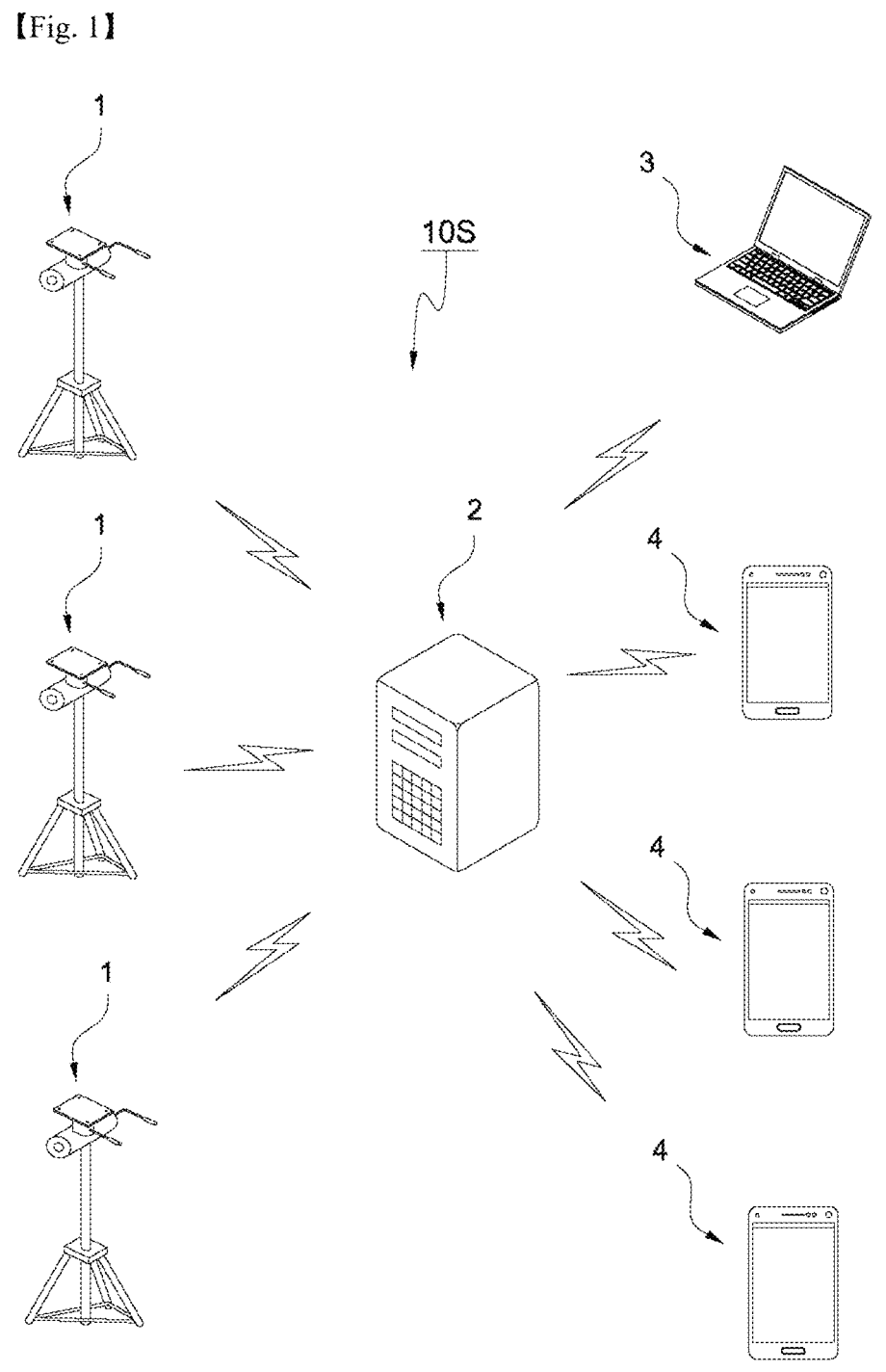

【Fig. 1】

【Fig. 2】
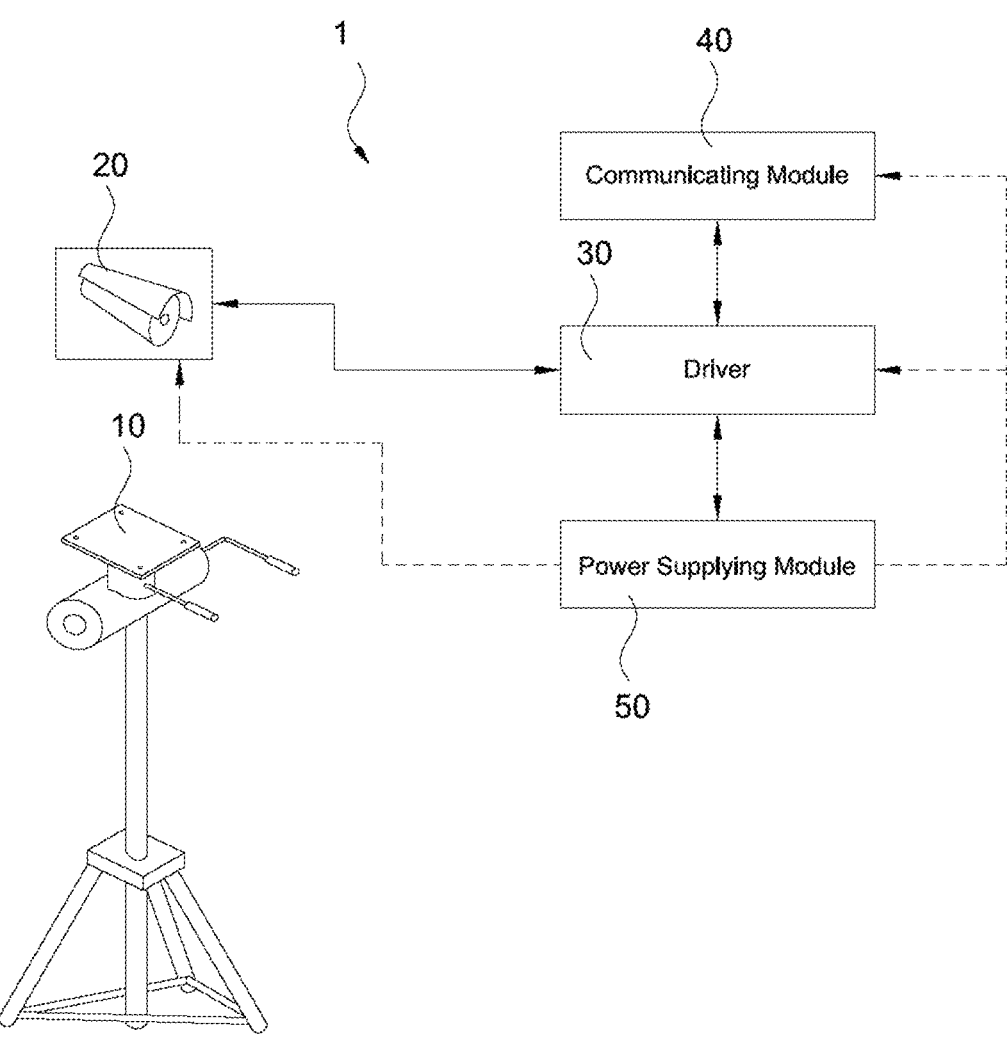

【Fig. 3】
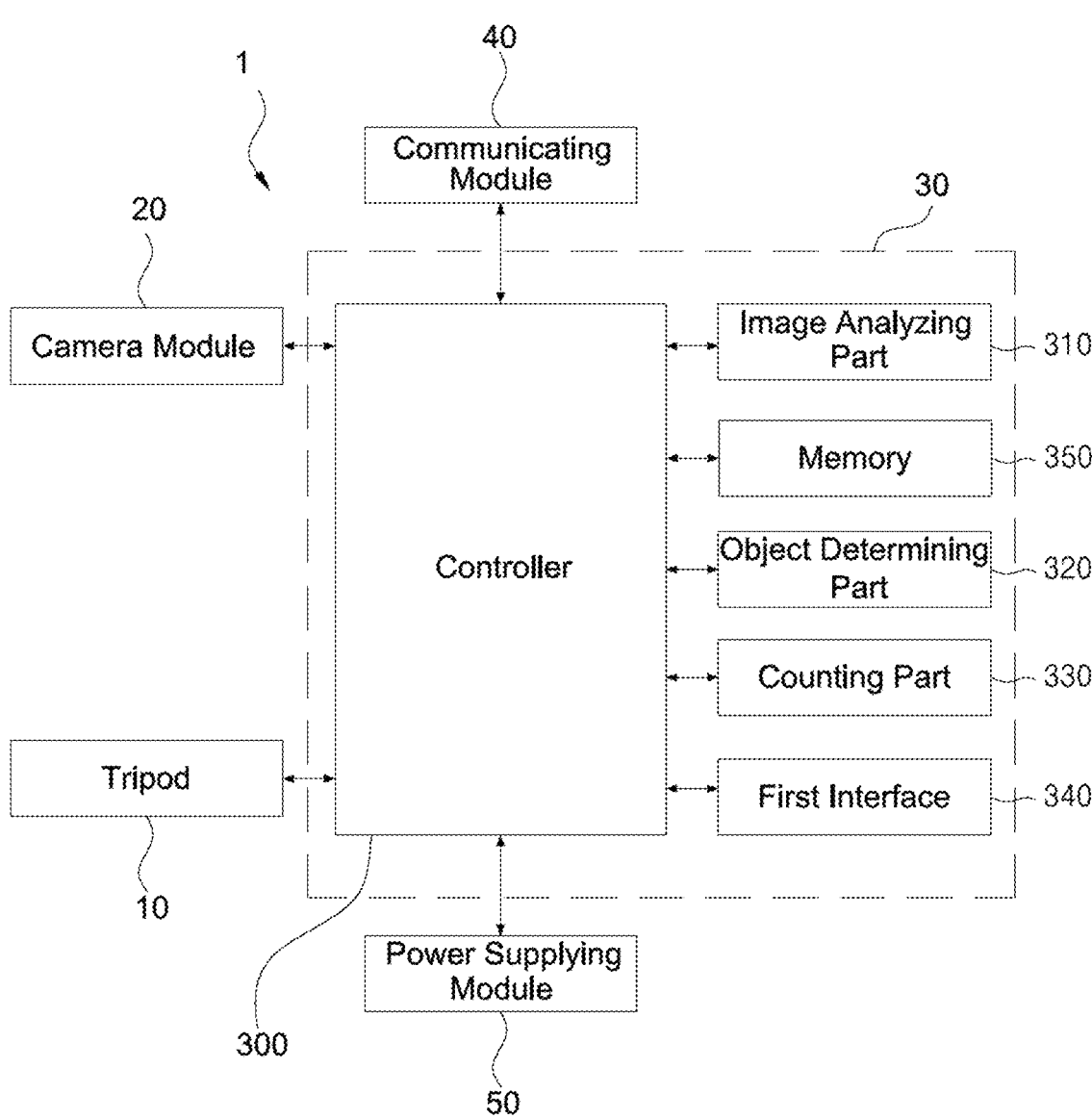

【Fig. 4】
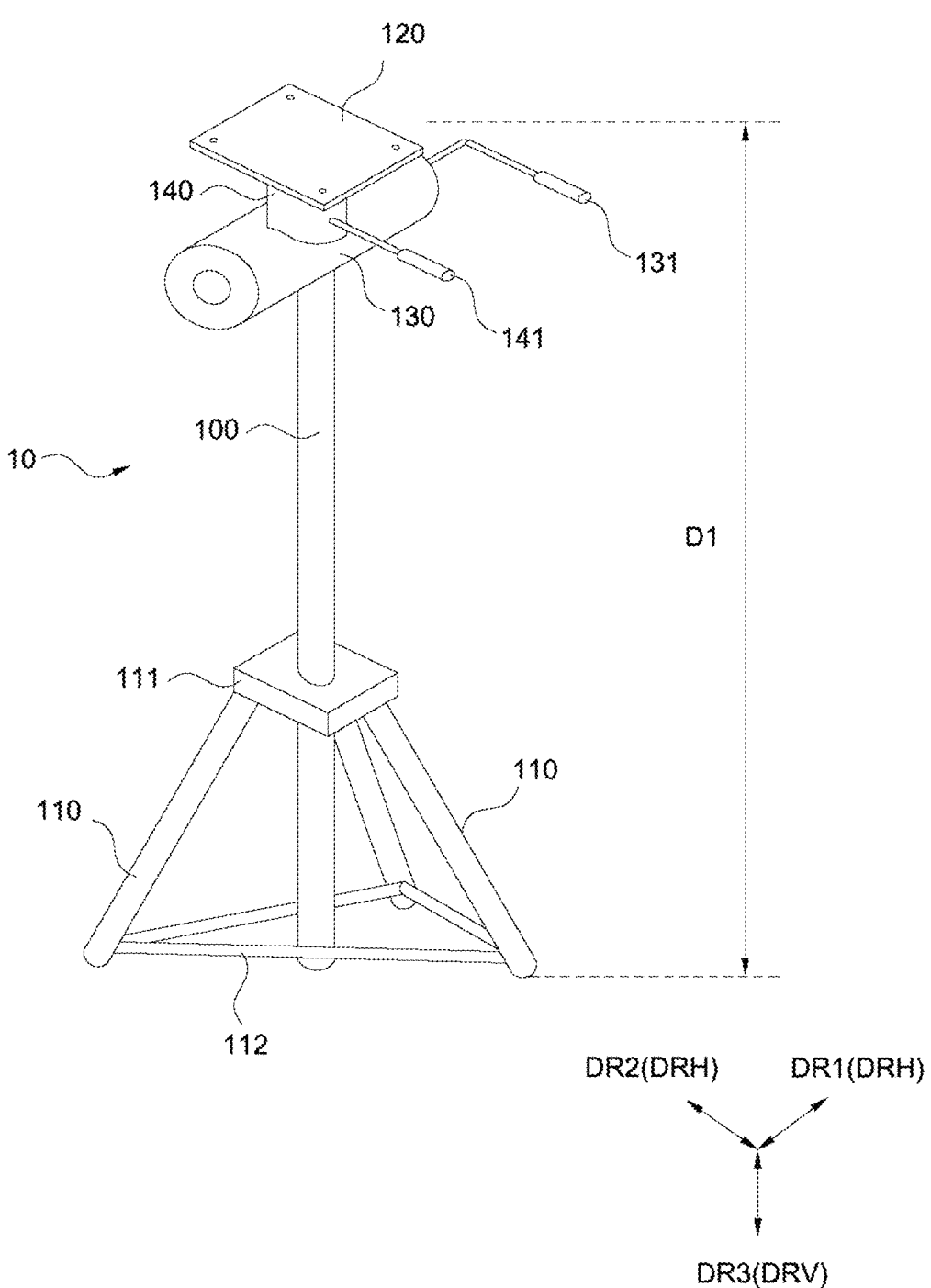

【Fig. 5】
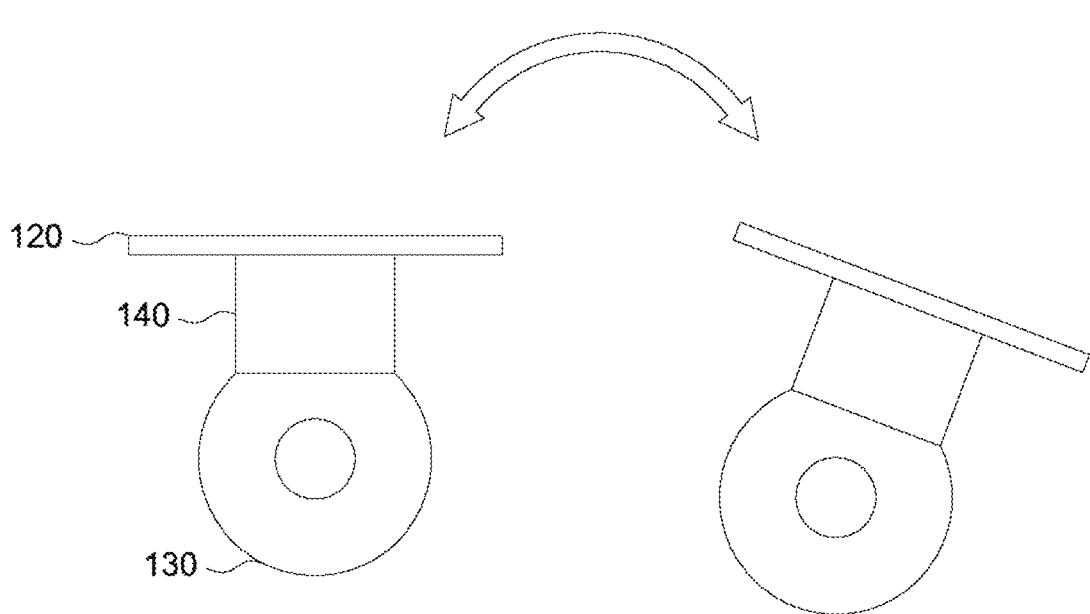
120
140
130
【Fig. 6】
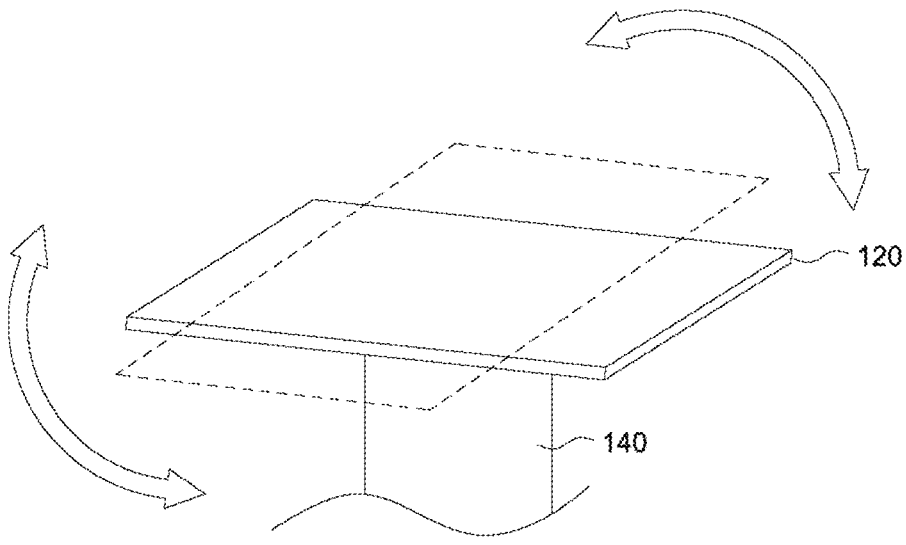
120
140

【Fig. 7】
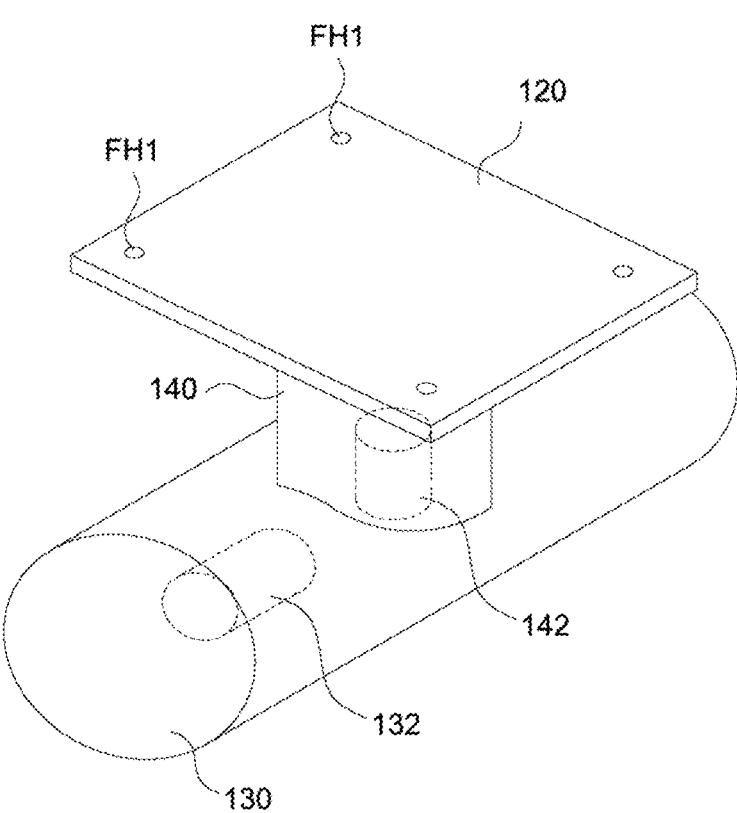

【Fig. 8】
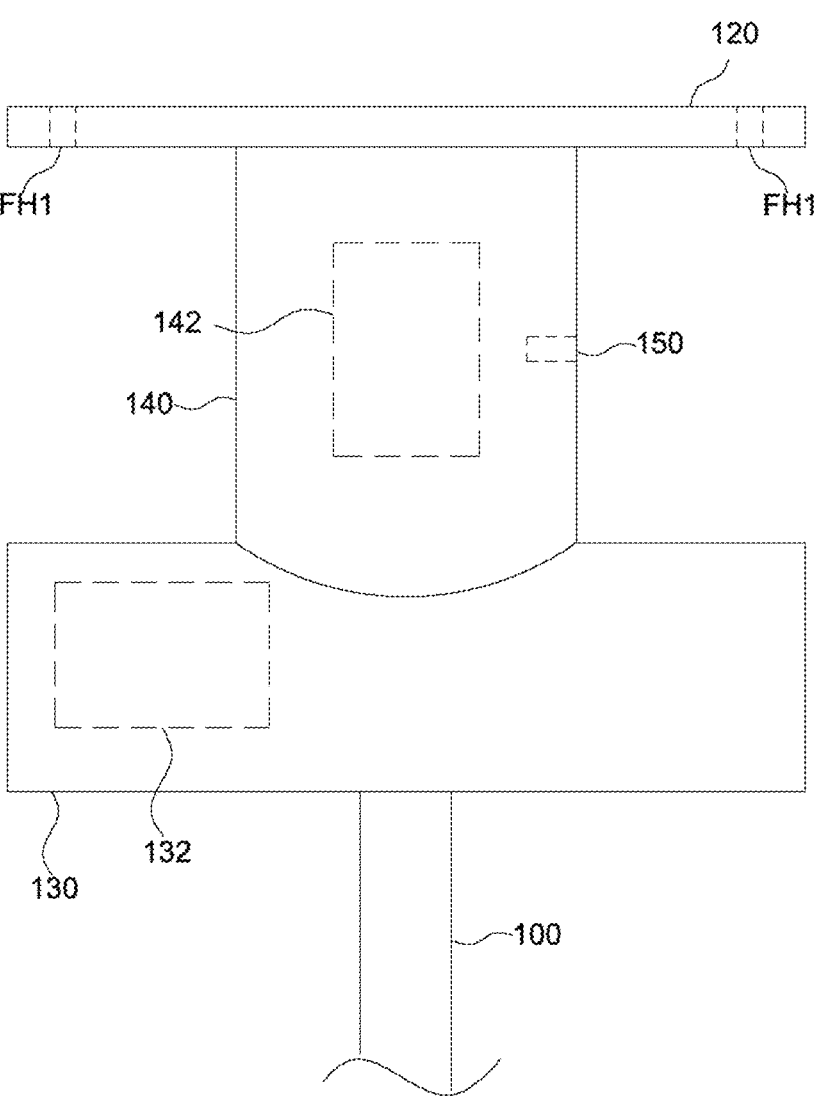

【Fig. 9】
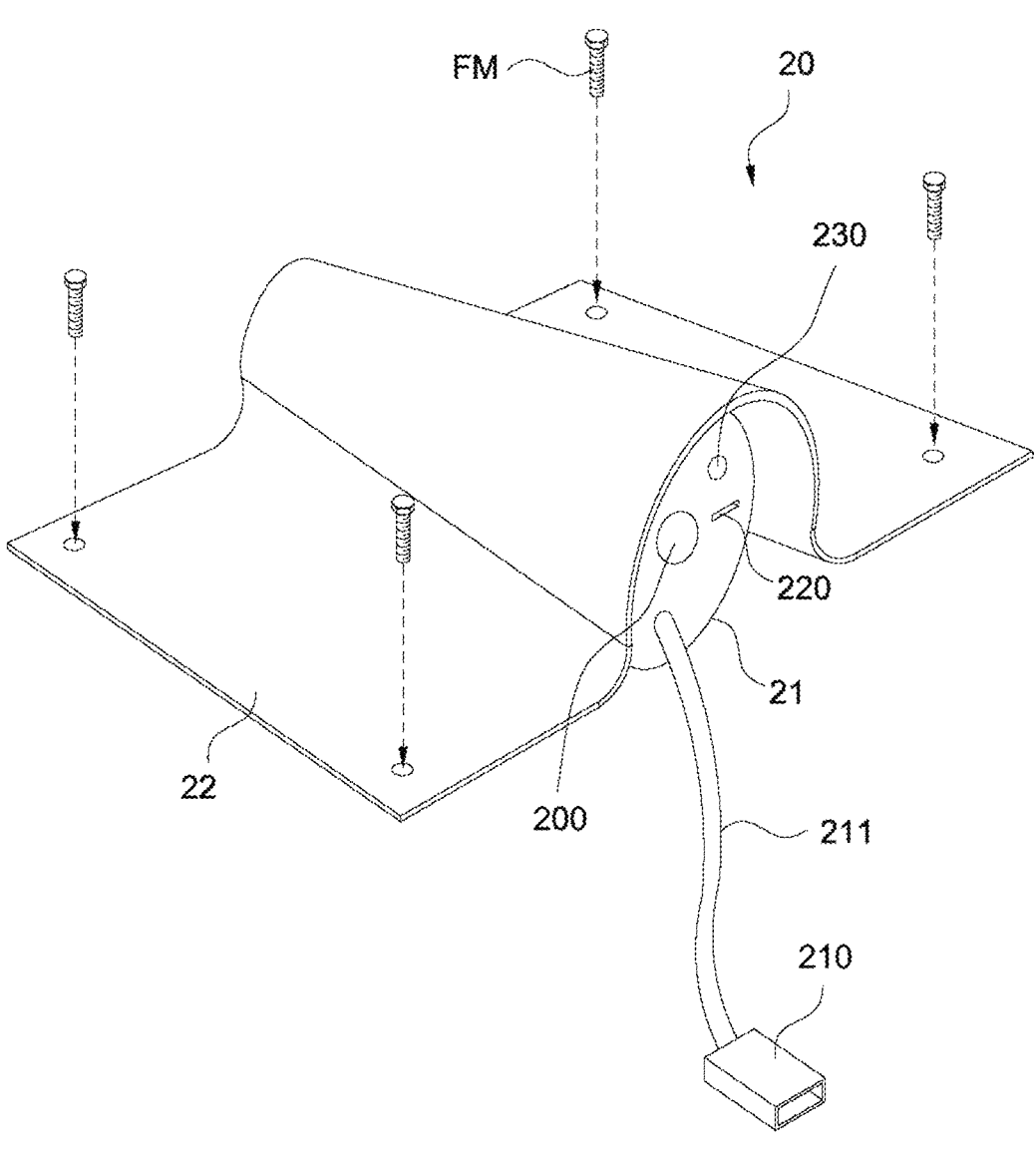

【Fig. 10】
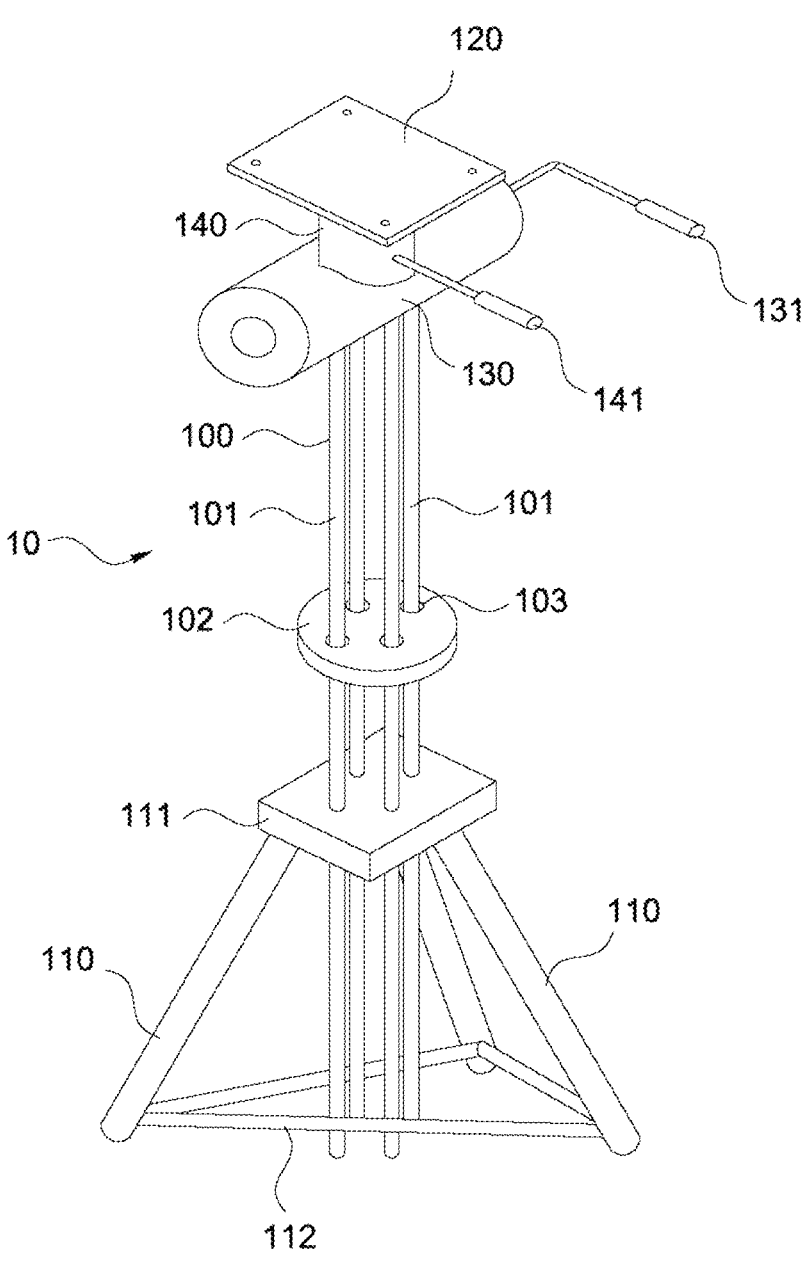

【Fig. 11】
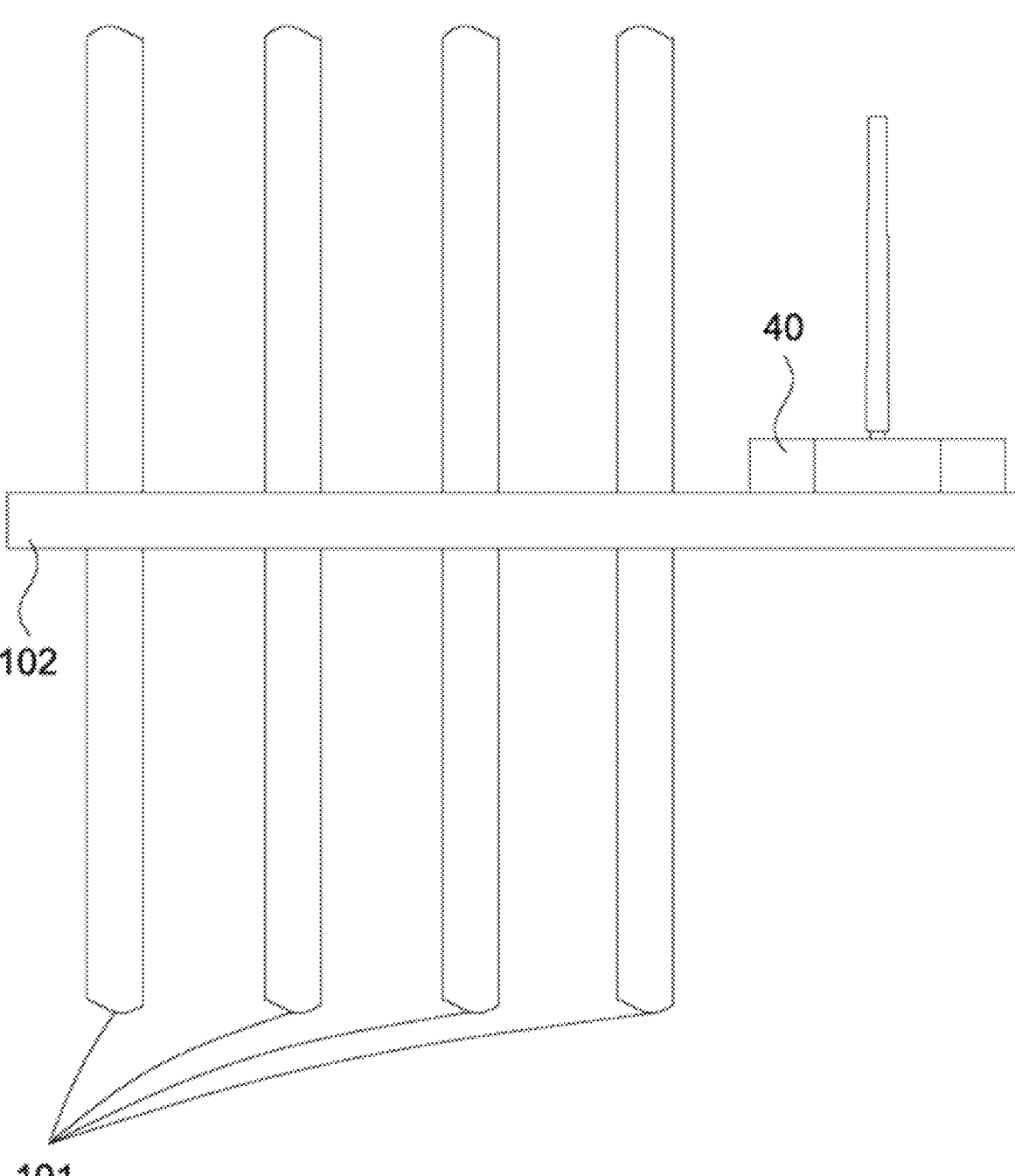

【Fig. 12A】
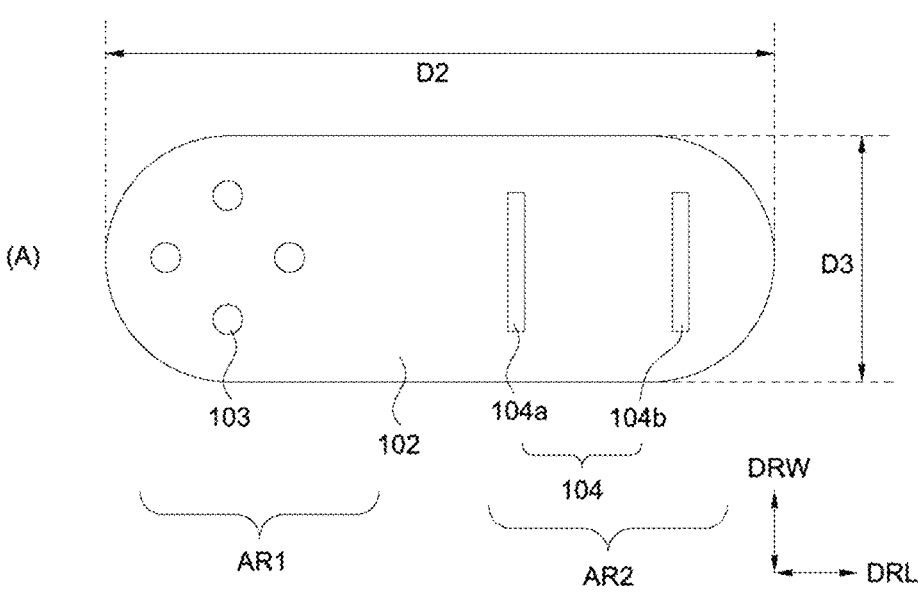
【Fig. 12B】
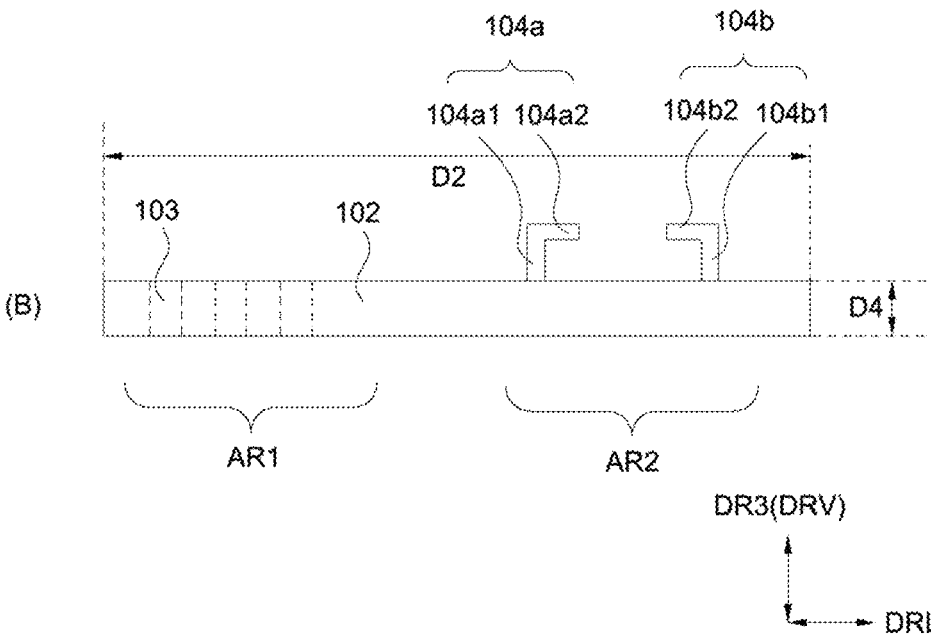

【Fig. 13】
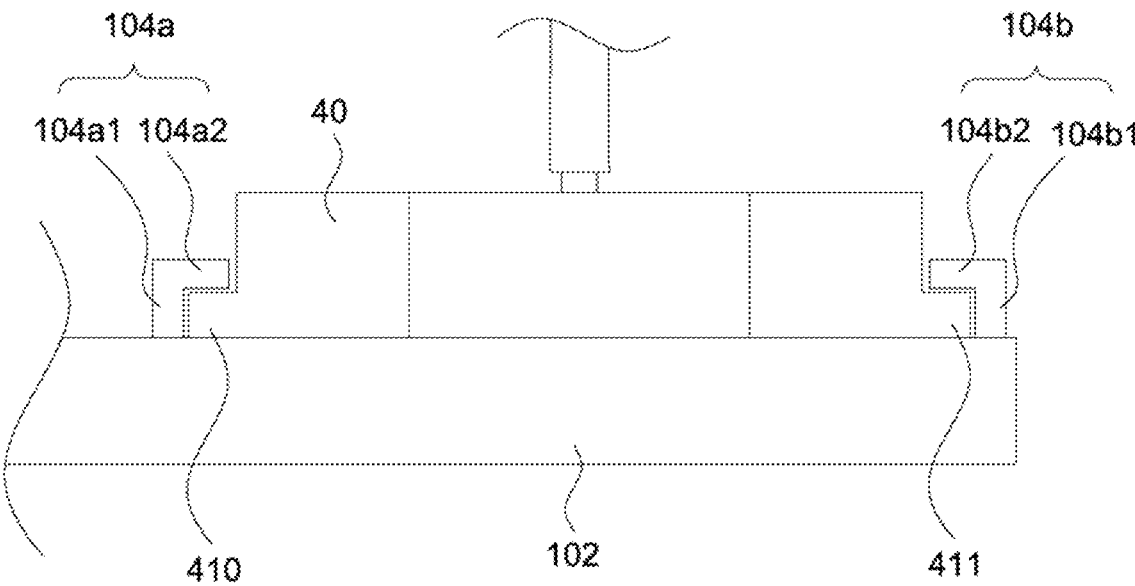
【Fig. 14】
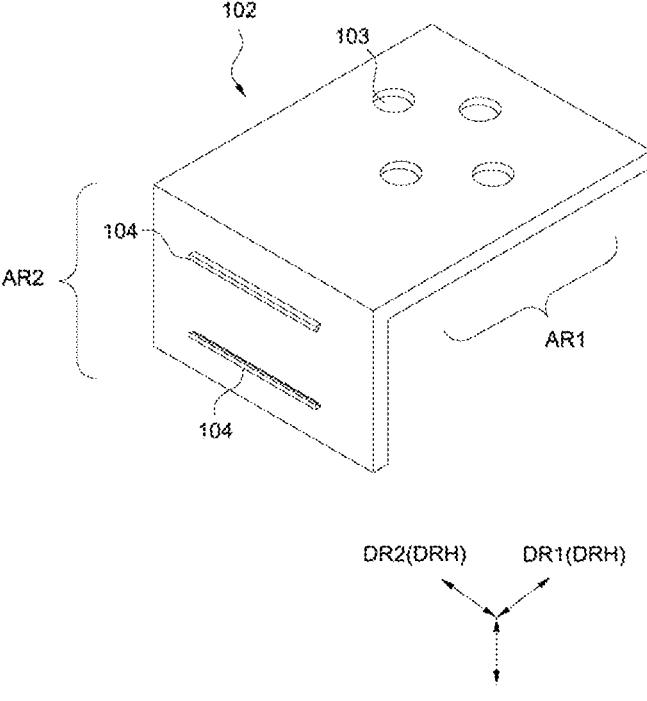

【Fig. 15】
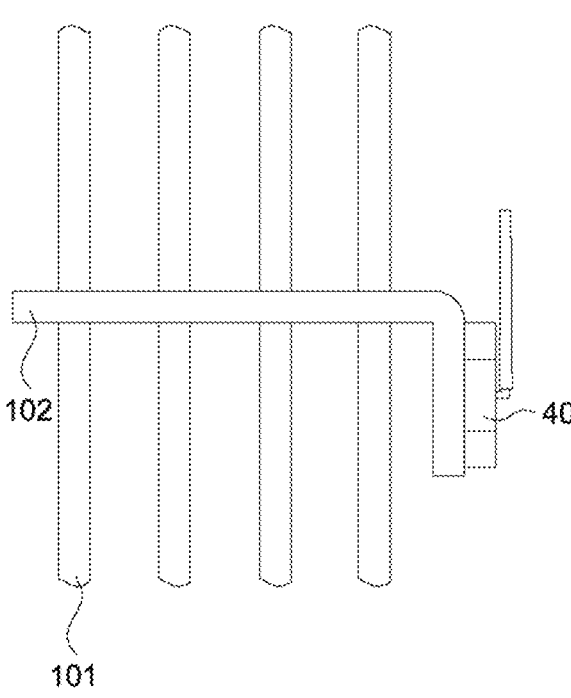
【Fig. 16】
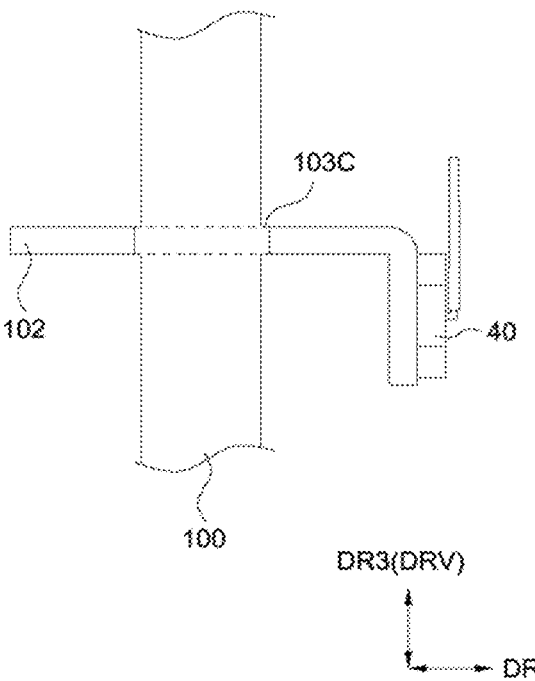

【Fig. 17】
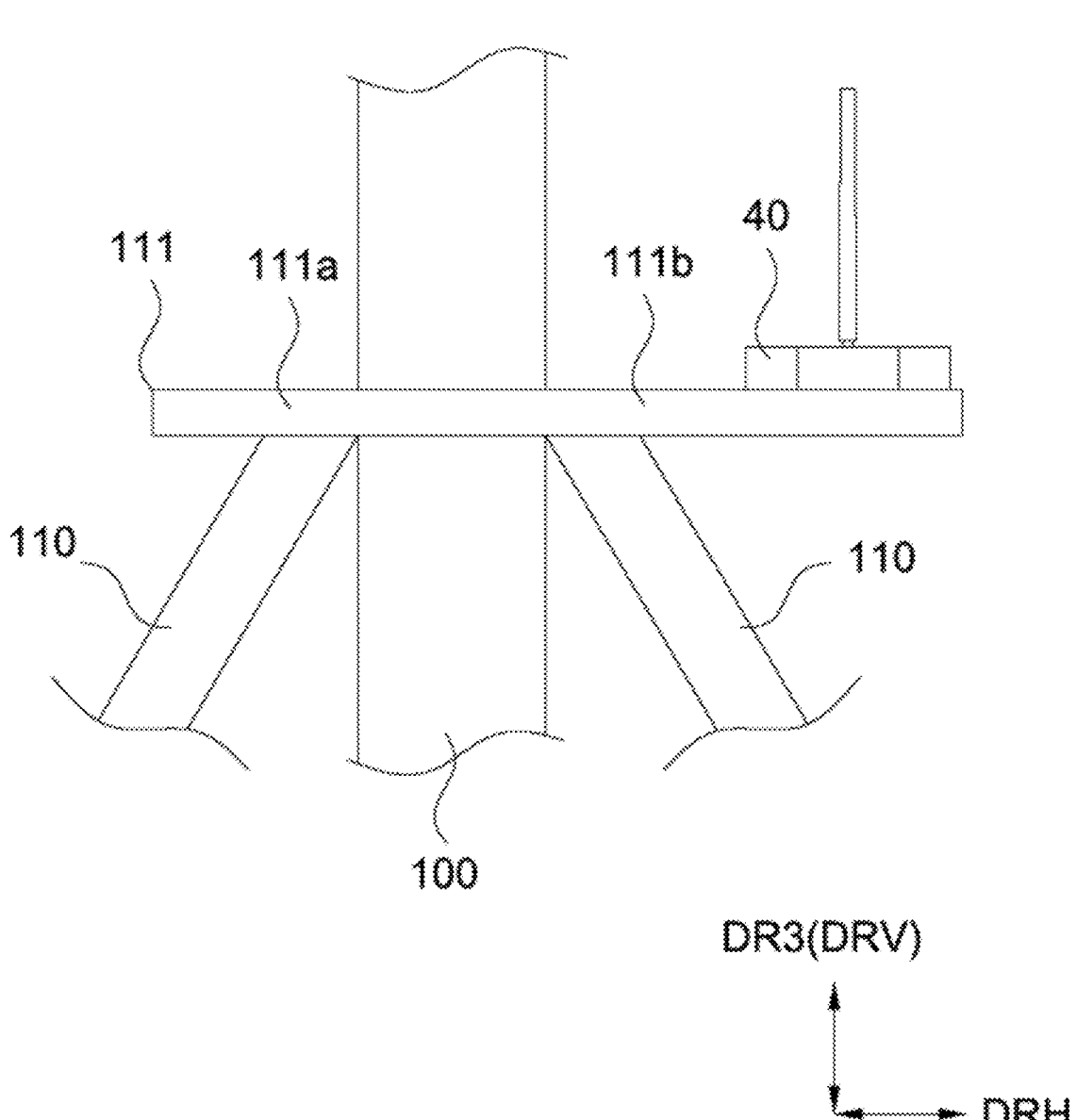

【Fig. 18】
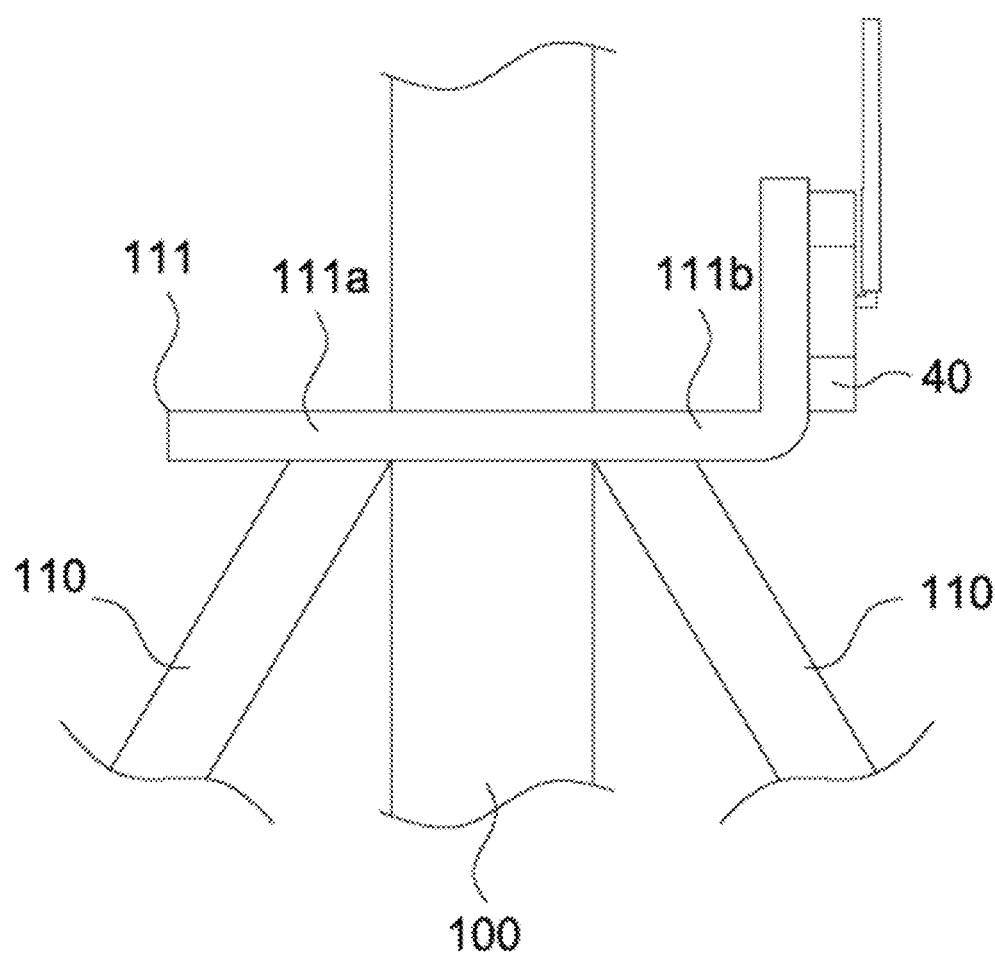

【Fig. 19A】
(A)
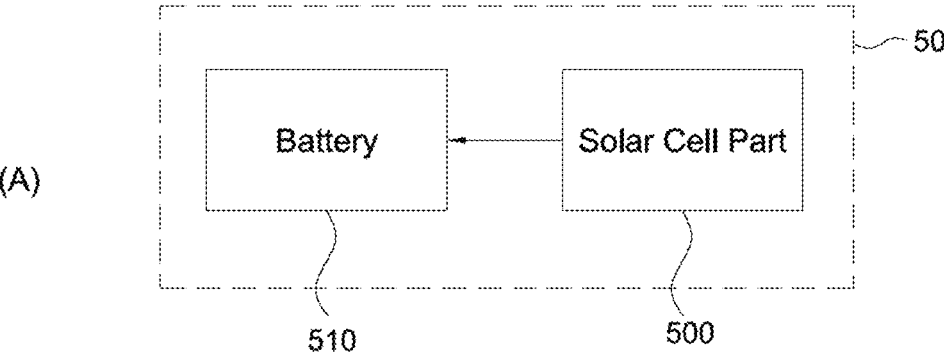
【Fig. 19B】
(B)
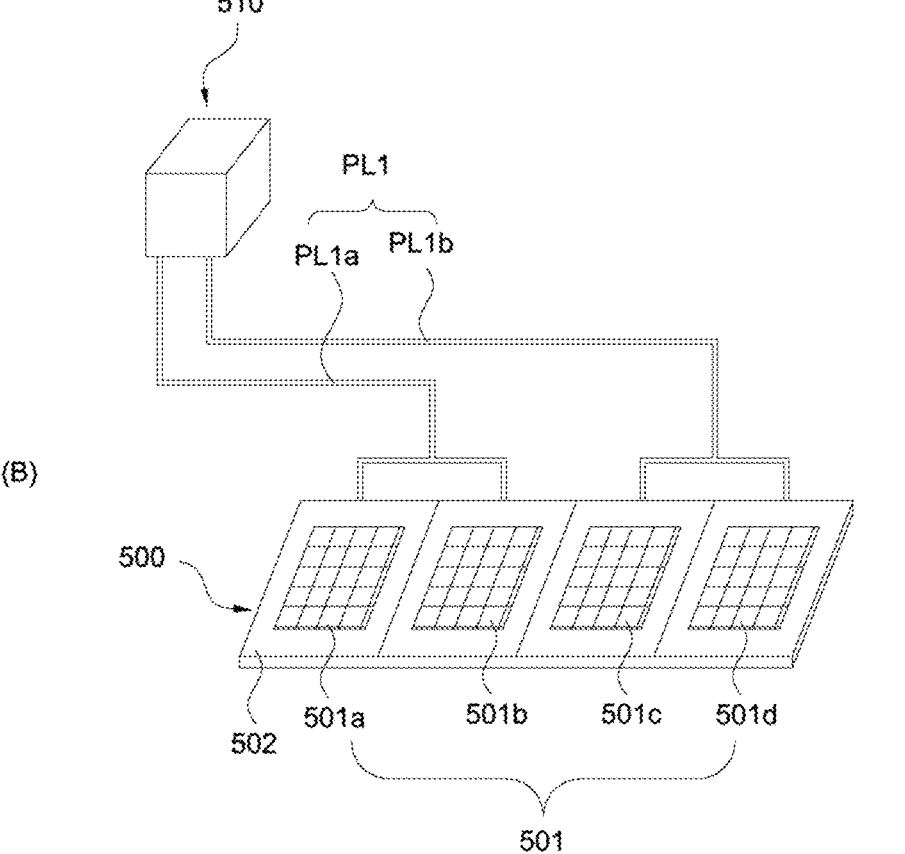

【Fig. 20】
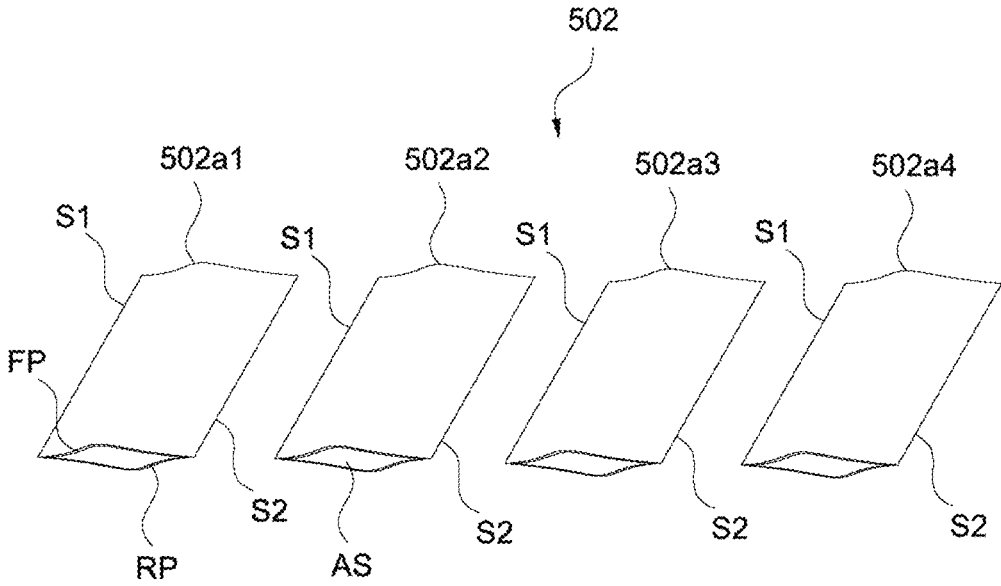
【Fig. 21】
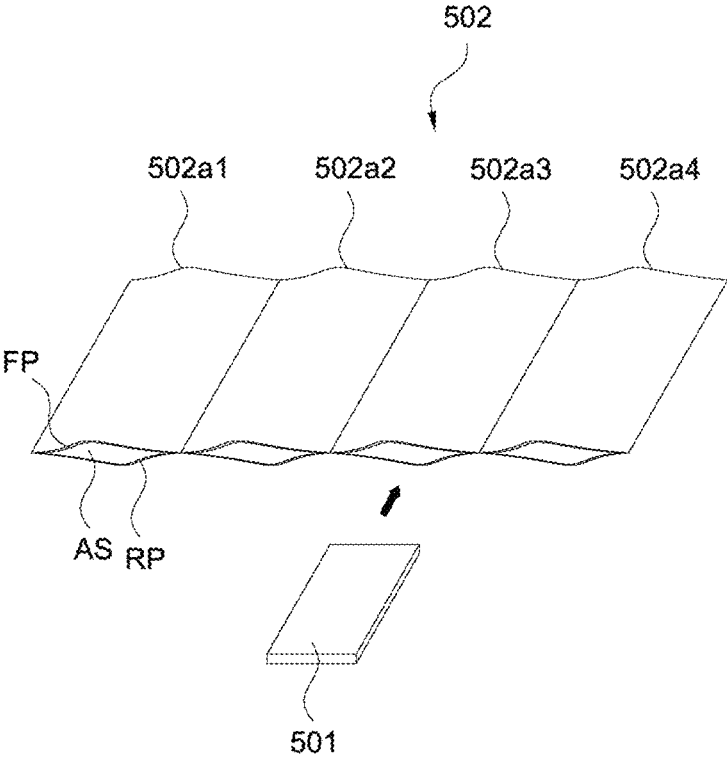

【Fig. 22A】
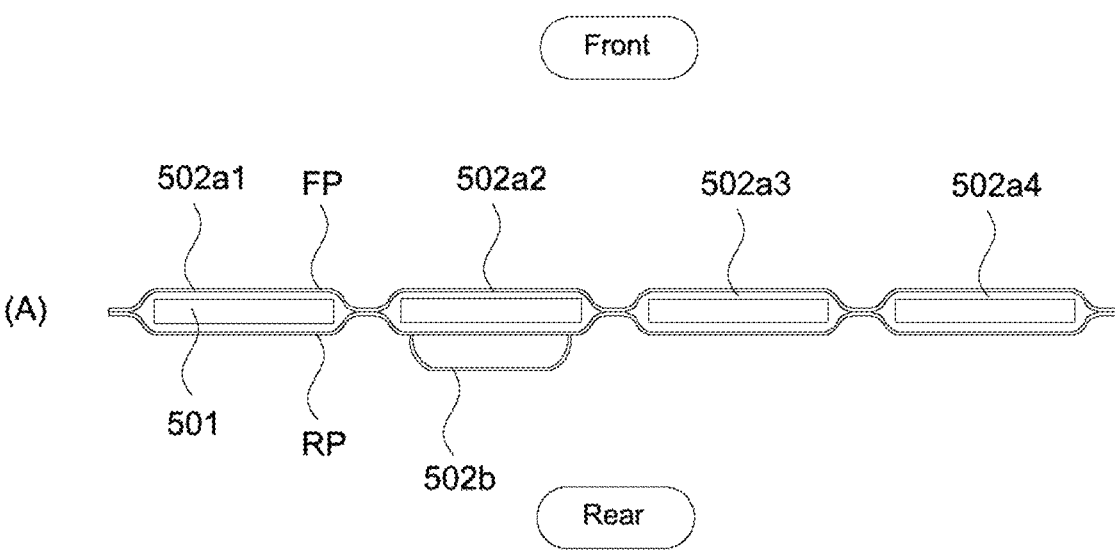
【Fig. 22B】
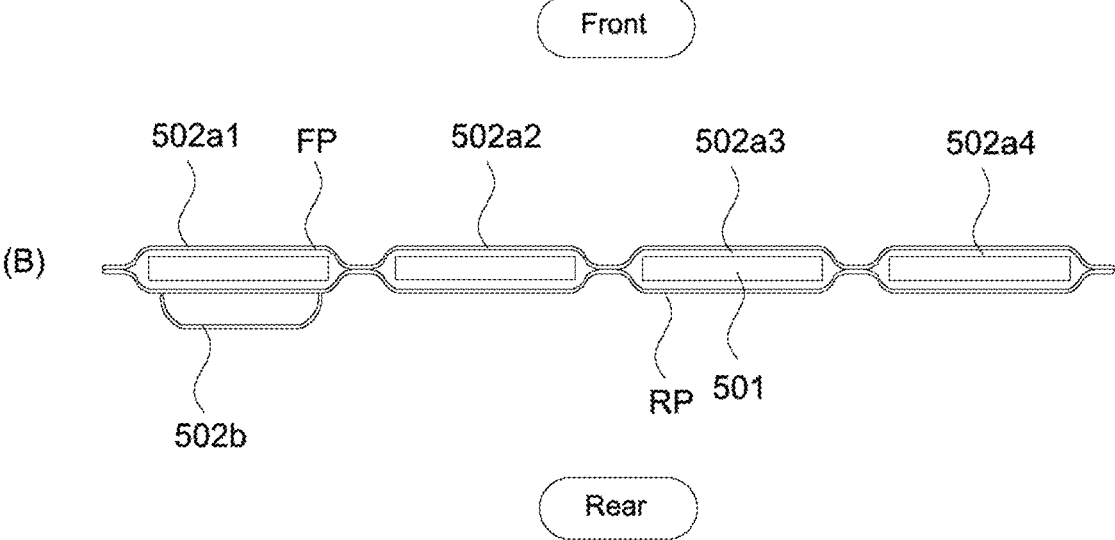

【Fig. 23】
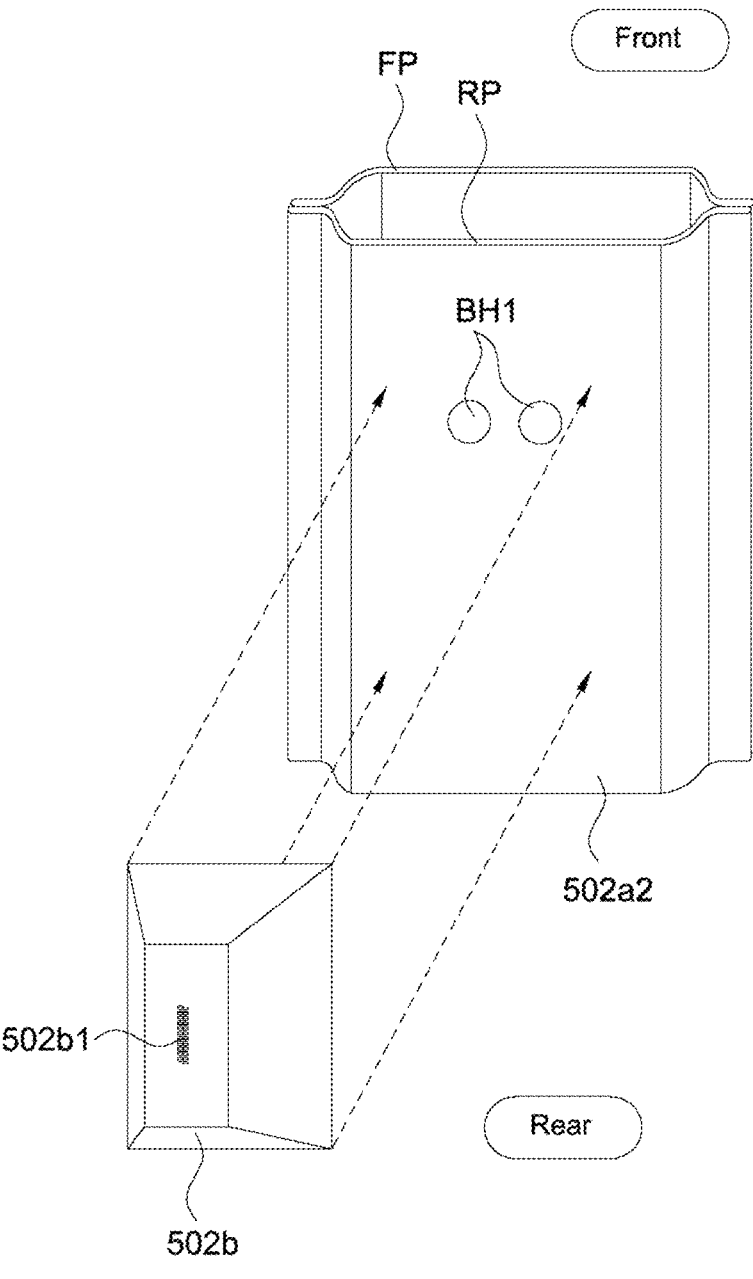

【Fig. 24A】
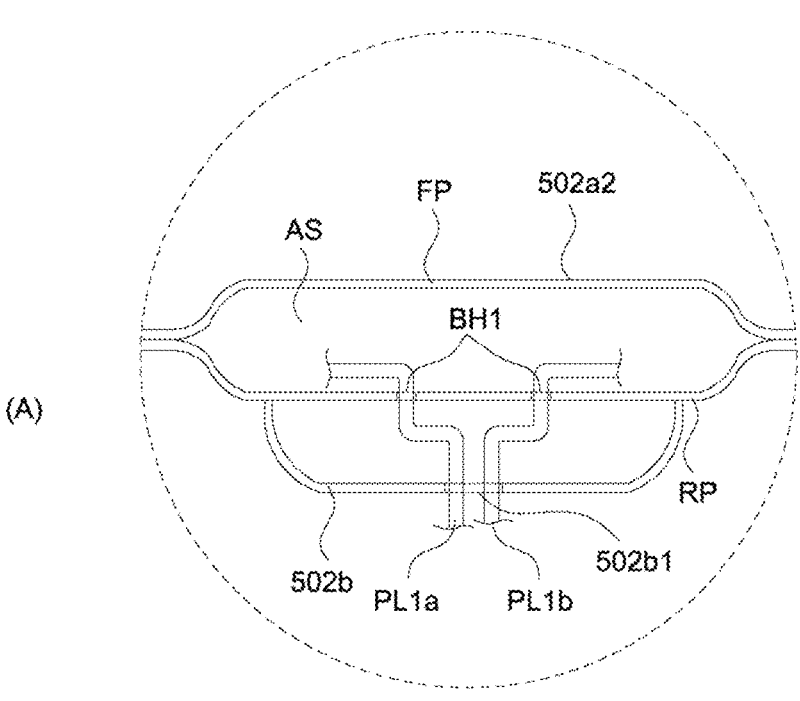
(A)
【Fig. 24B】
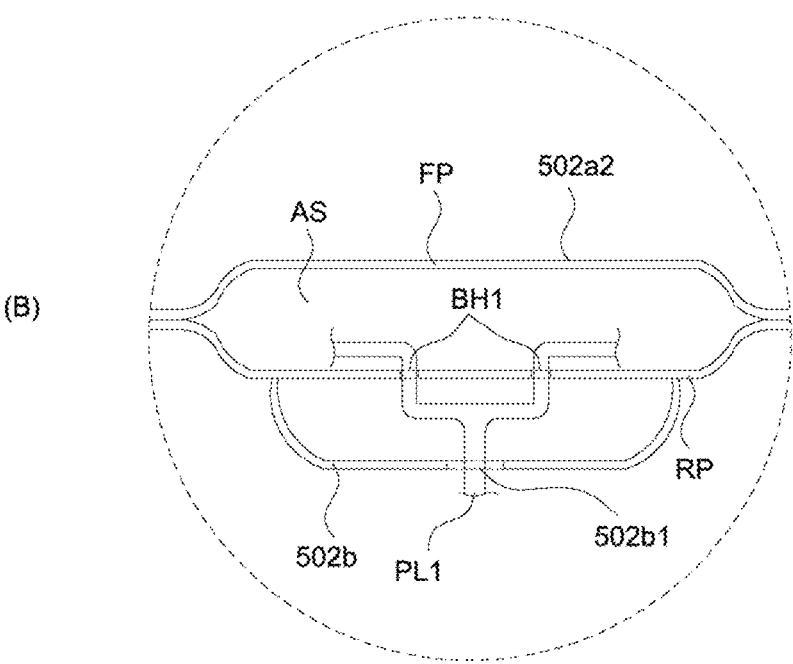
(B)

【Fig. 25A】
(A)
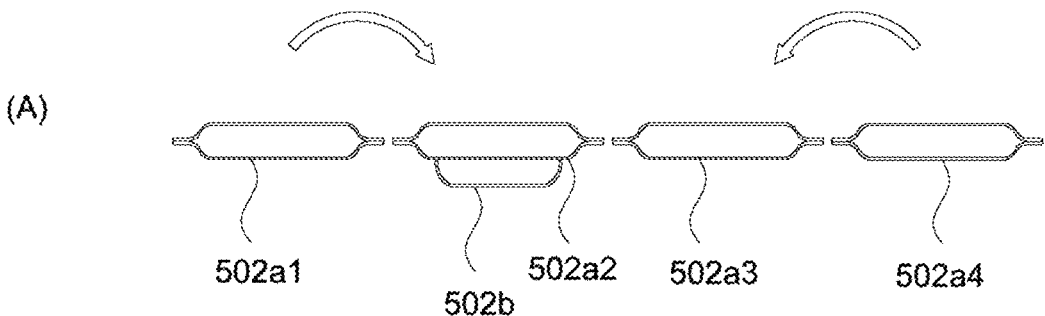
502a1     502b     502a2     502a3     502a4
【Fig. 25B】
(B)
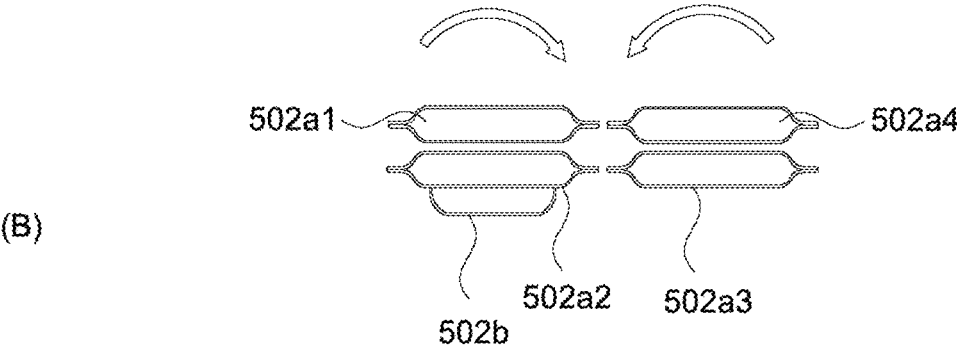
502a1     502a4     502b     502a2     502a3
【Fig. 25C】
(C)
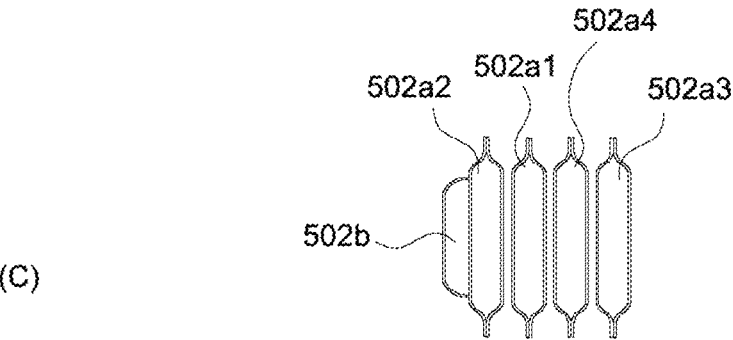
502a2     502a1     502a4     502a3     502b 【Fig. 26A】
(A)
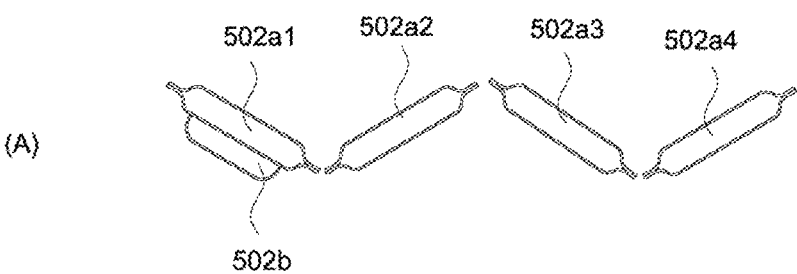
【Fig. 26B】
(B)
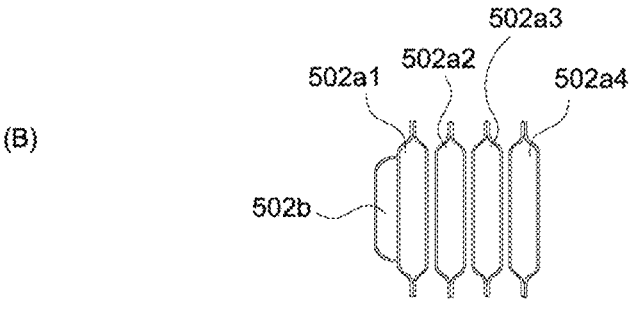
【Fig. 27】
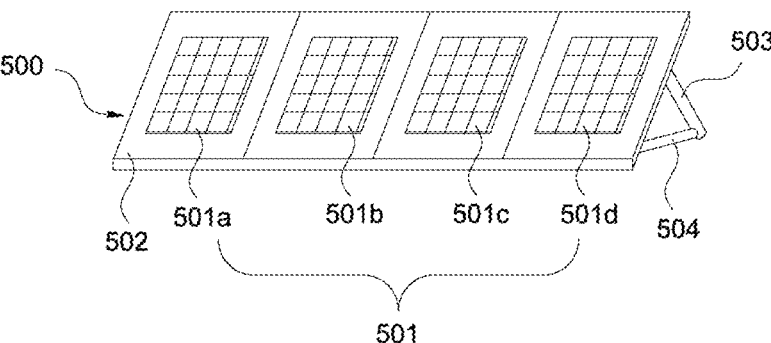

【Fig. 28A】
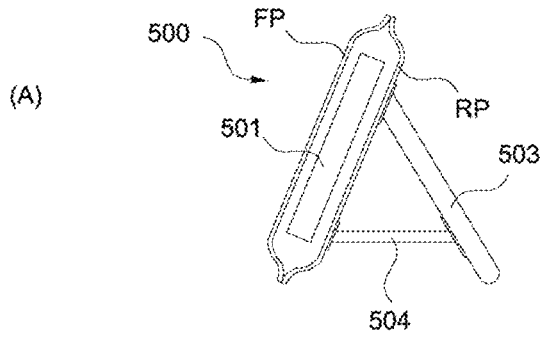
【Fig. 28B】
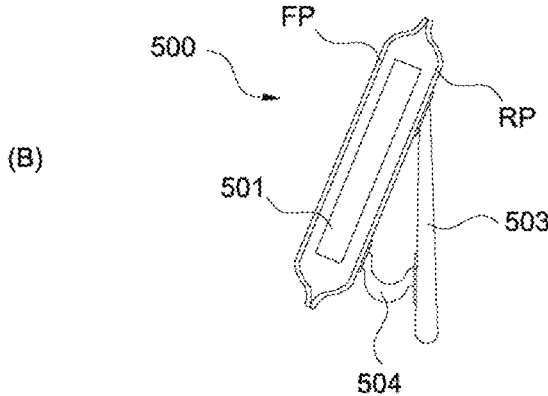
【Fig. 28C】
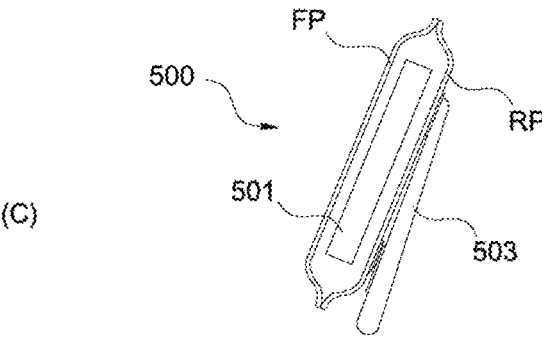

【Fig. 29】
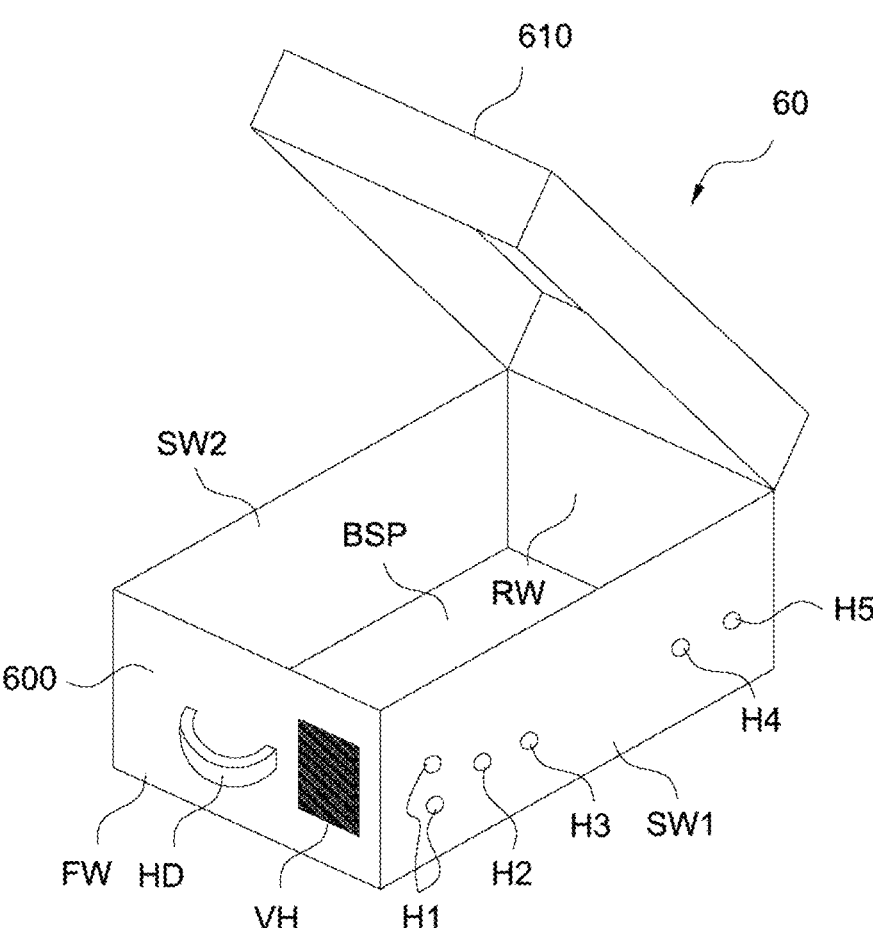

【Fig. 30】
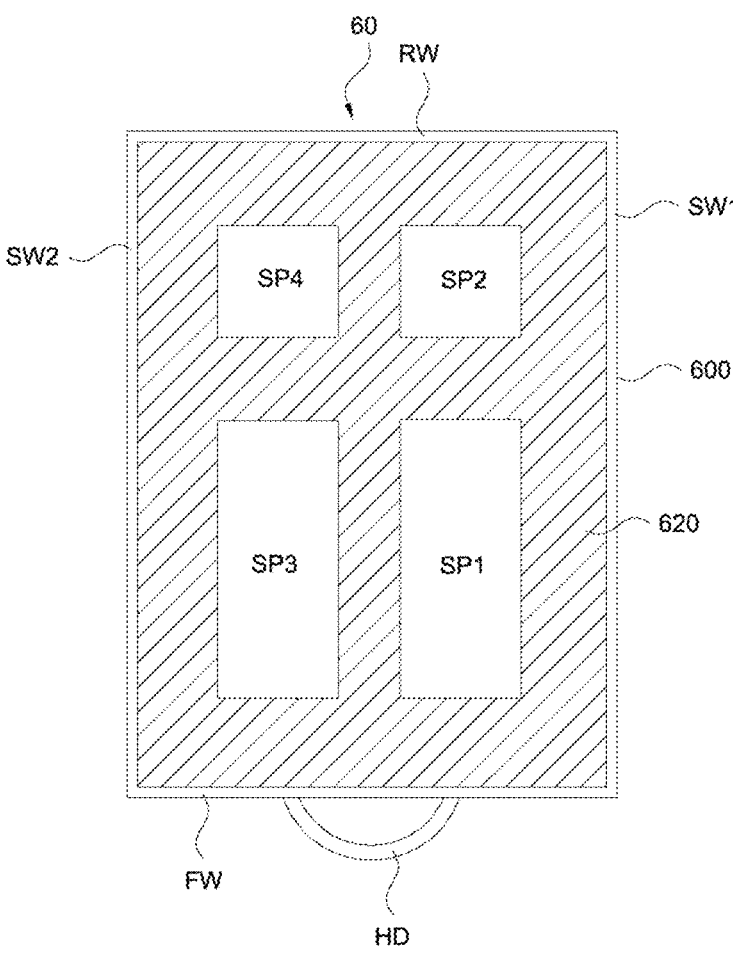

【Fig. 31】
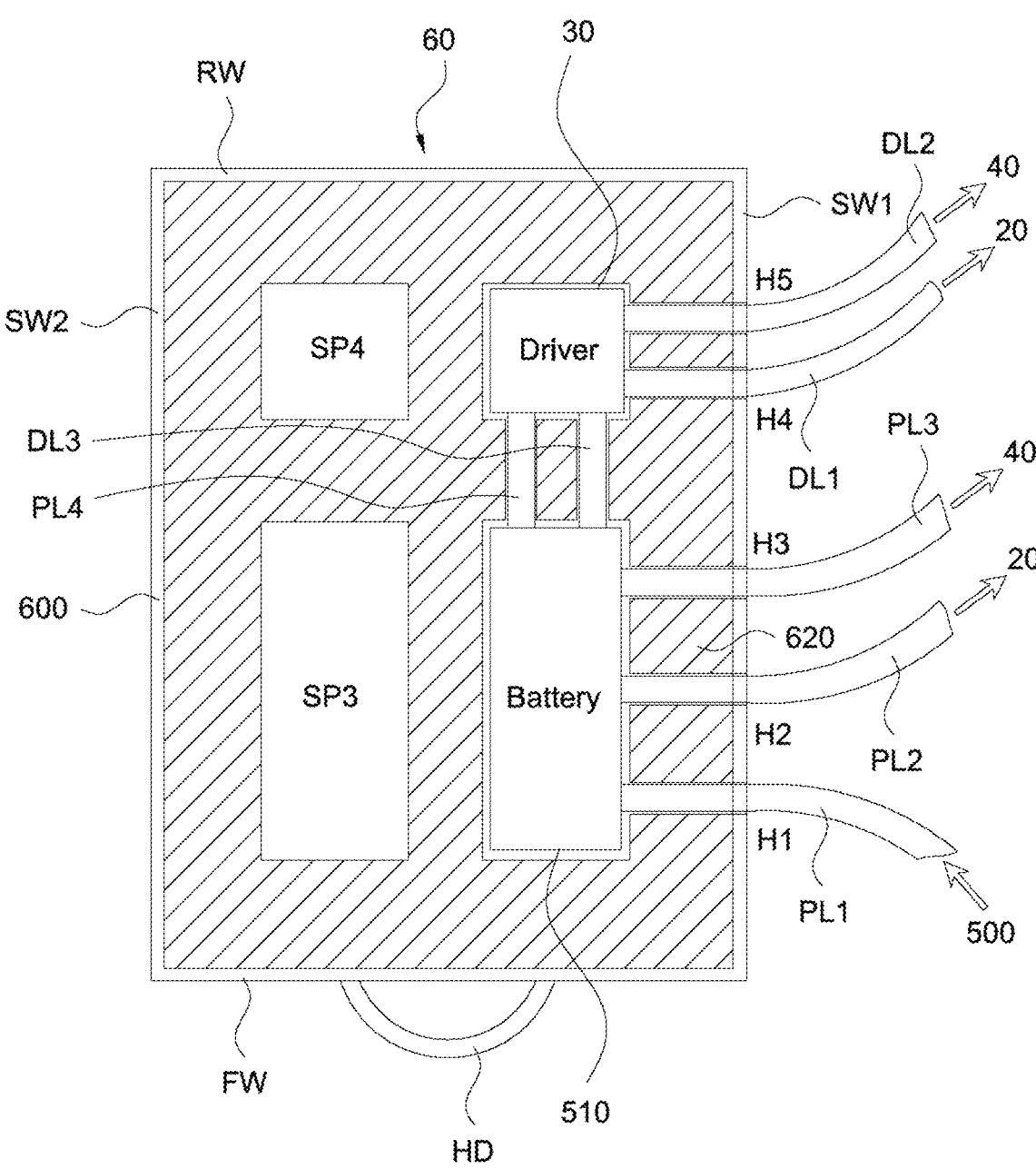

【Fig. 32】
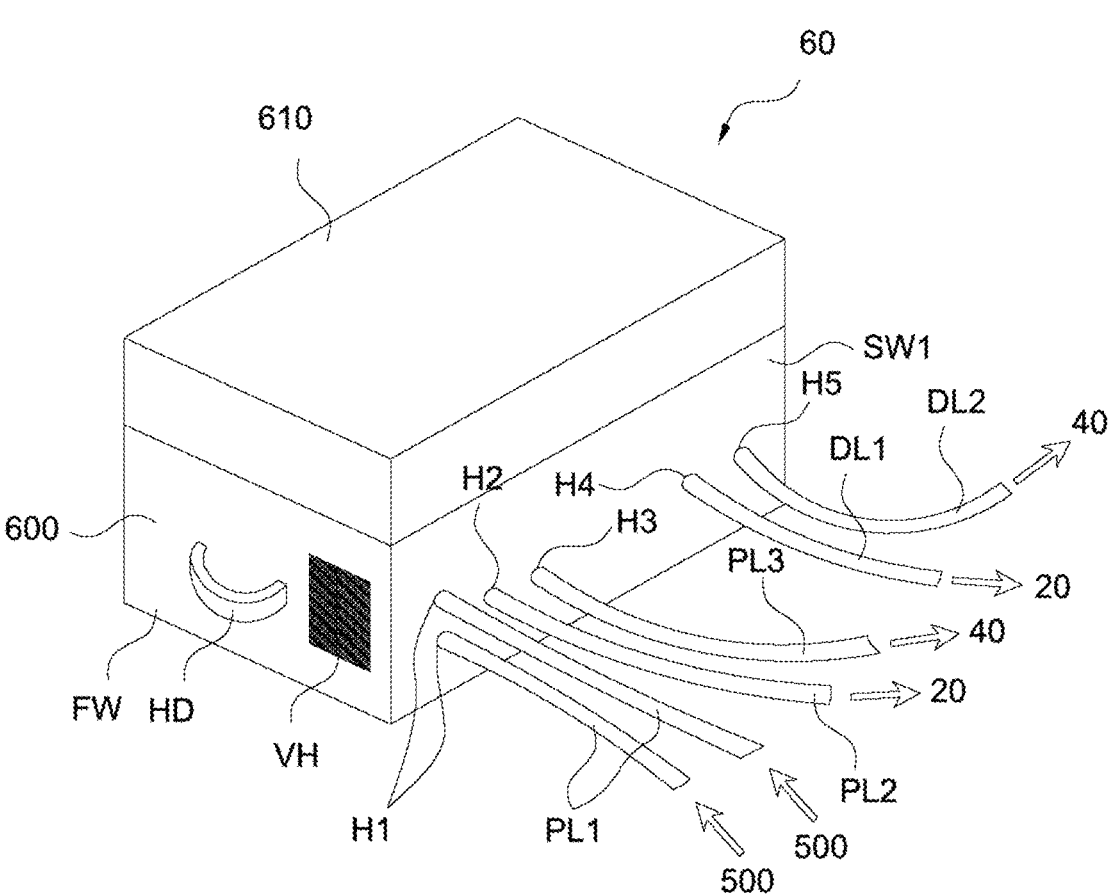

【Fig. 33】
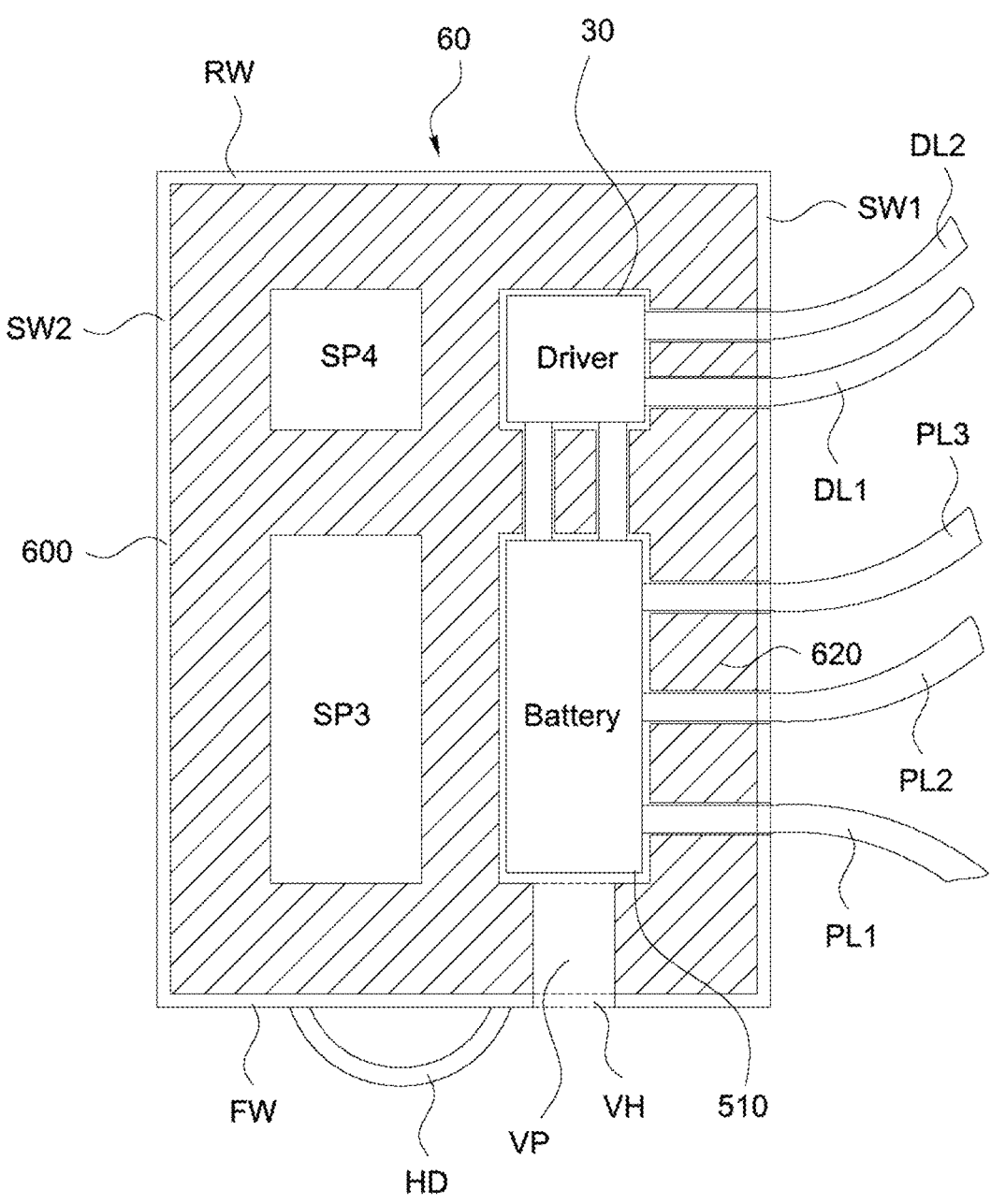

【Fig. 34】
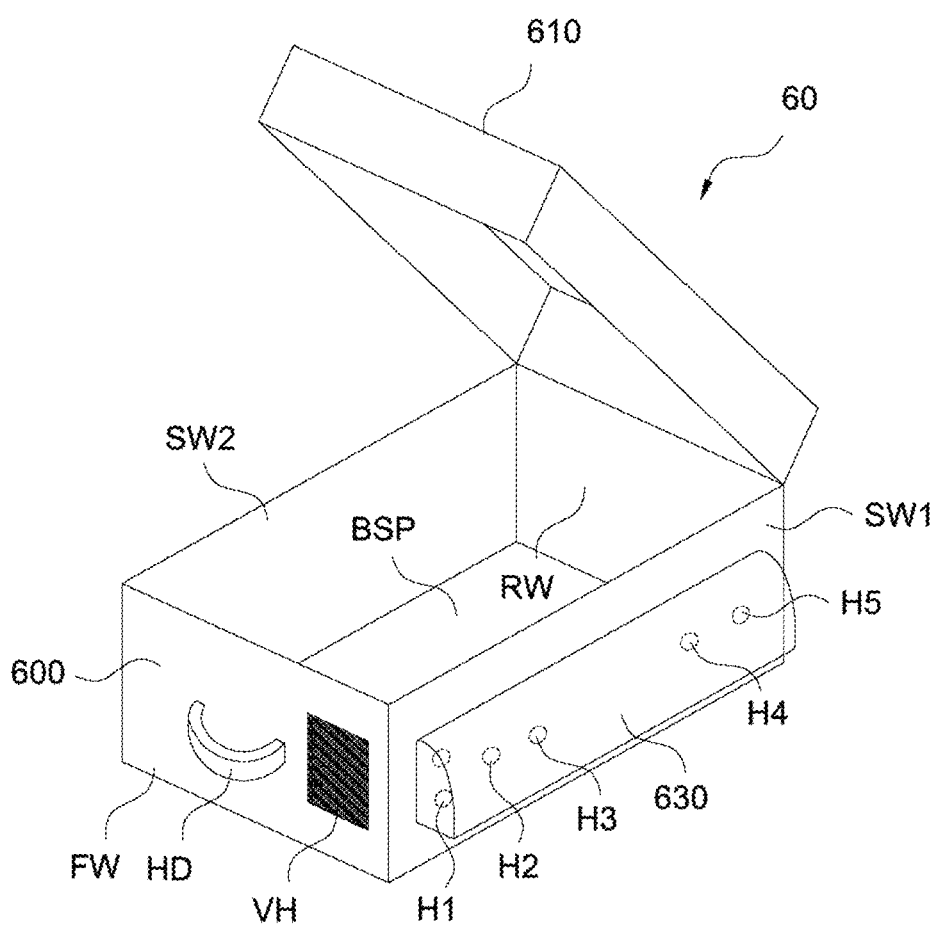

【Fig. 35】
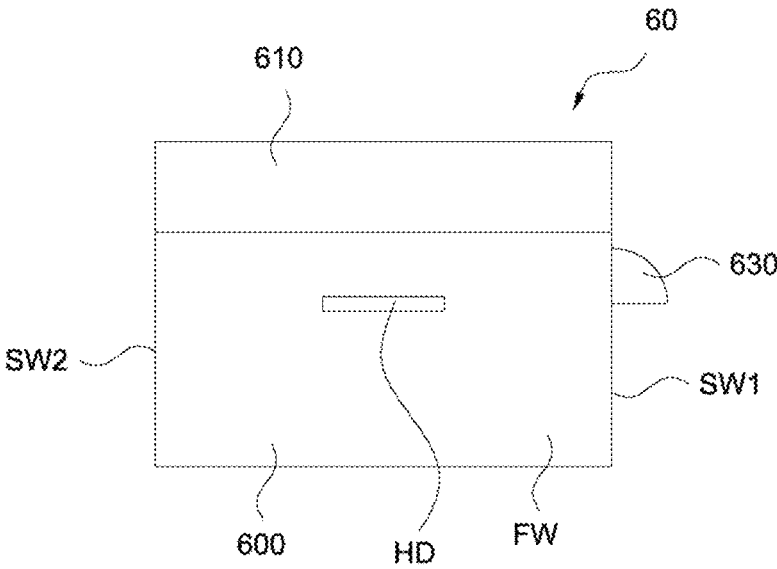
【Fig. 36】
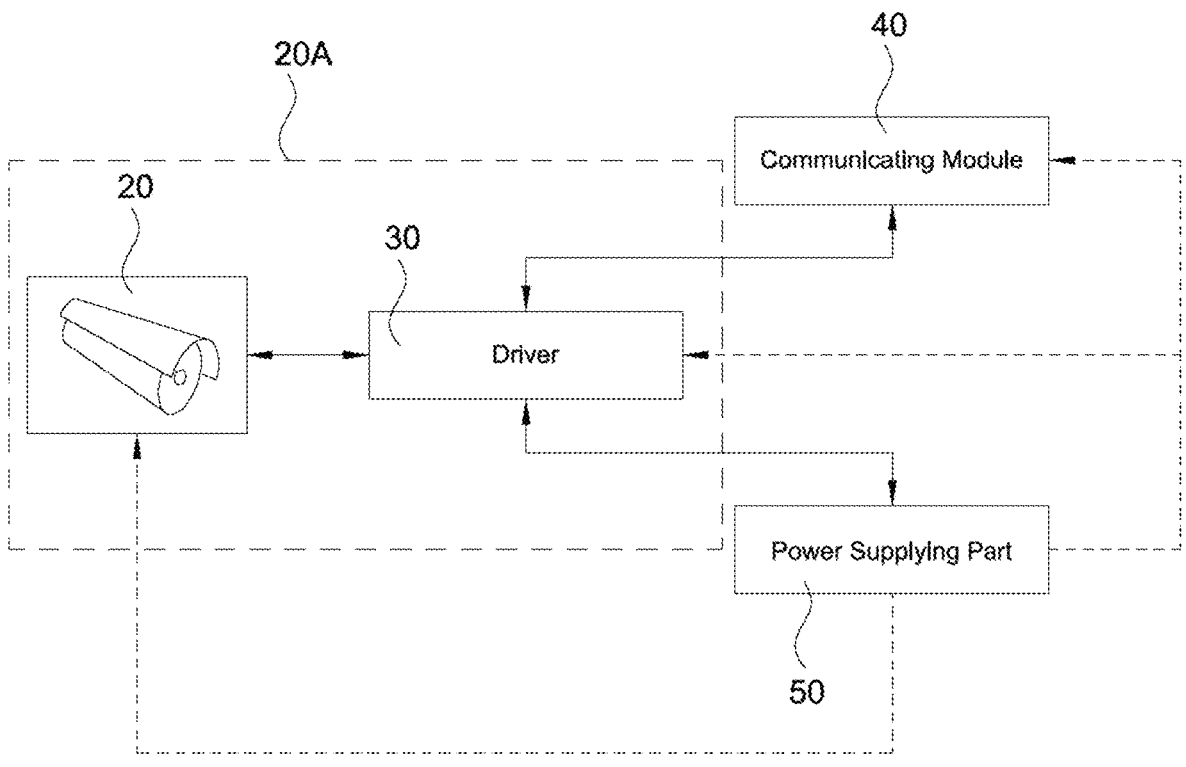

【Fig. 37】
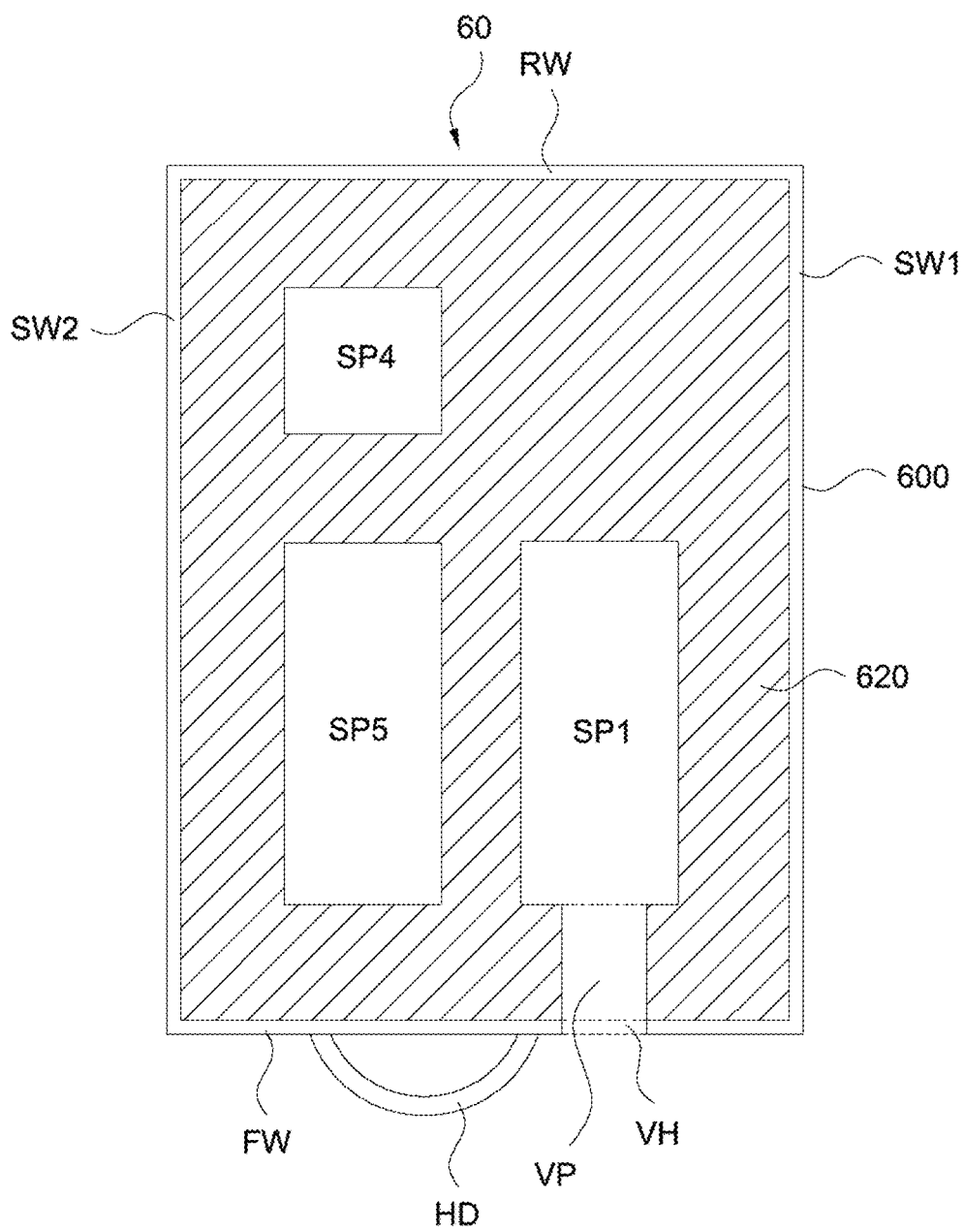

【Fig. 38A】
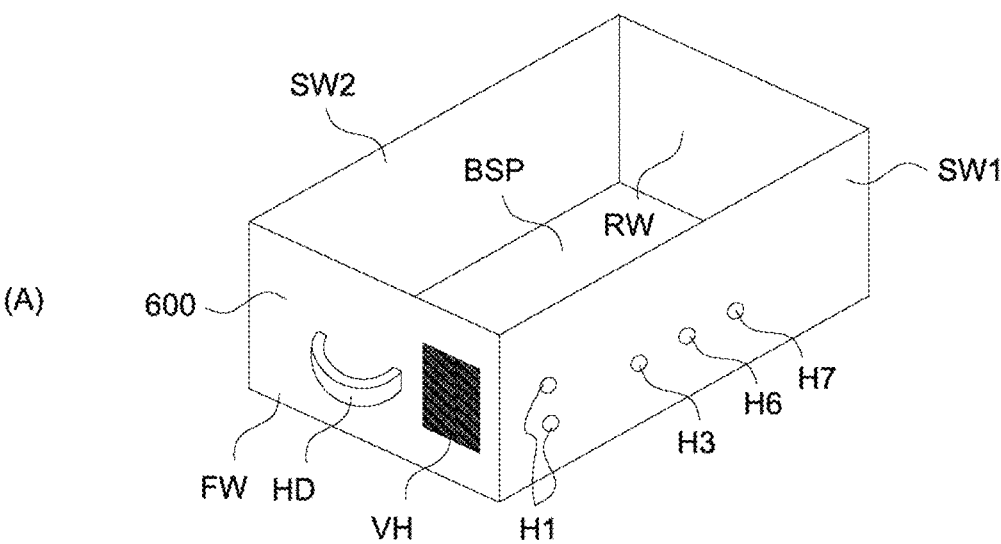
【Fig. 38B】
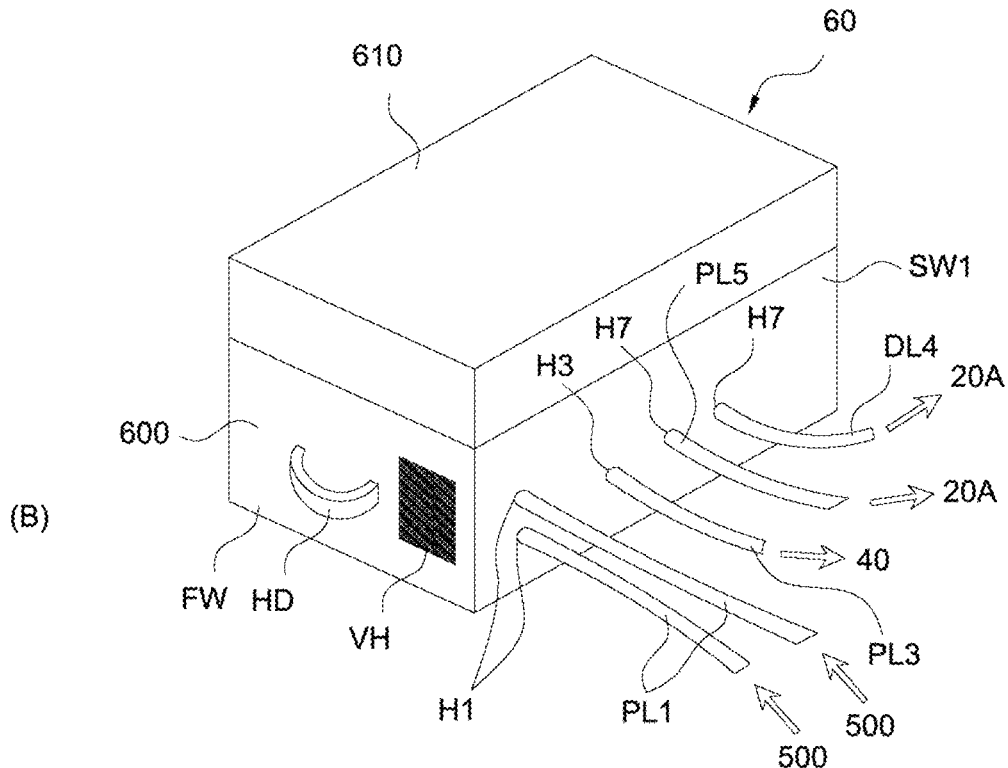

【Fig. 39】
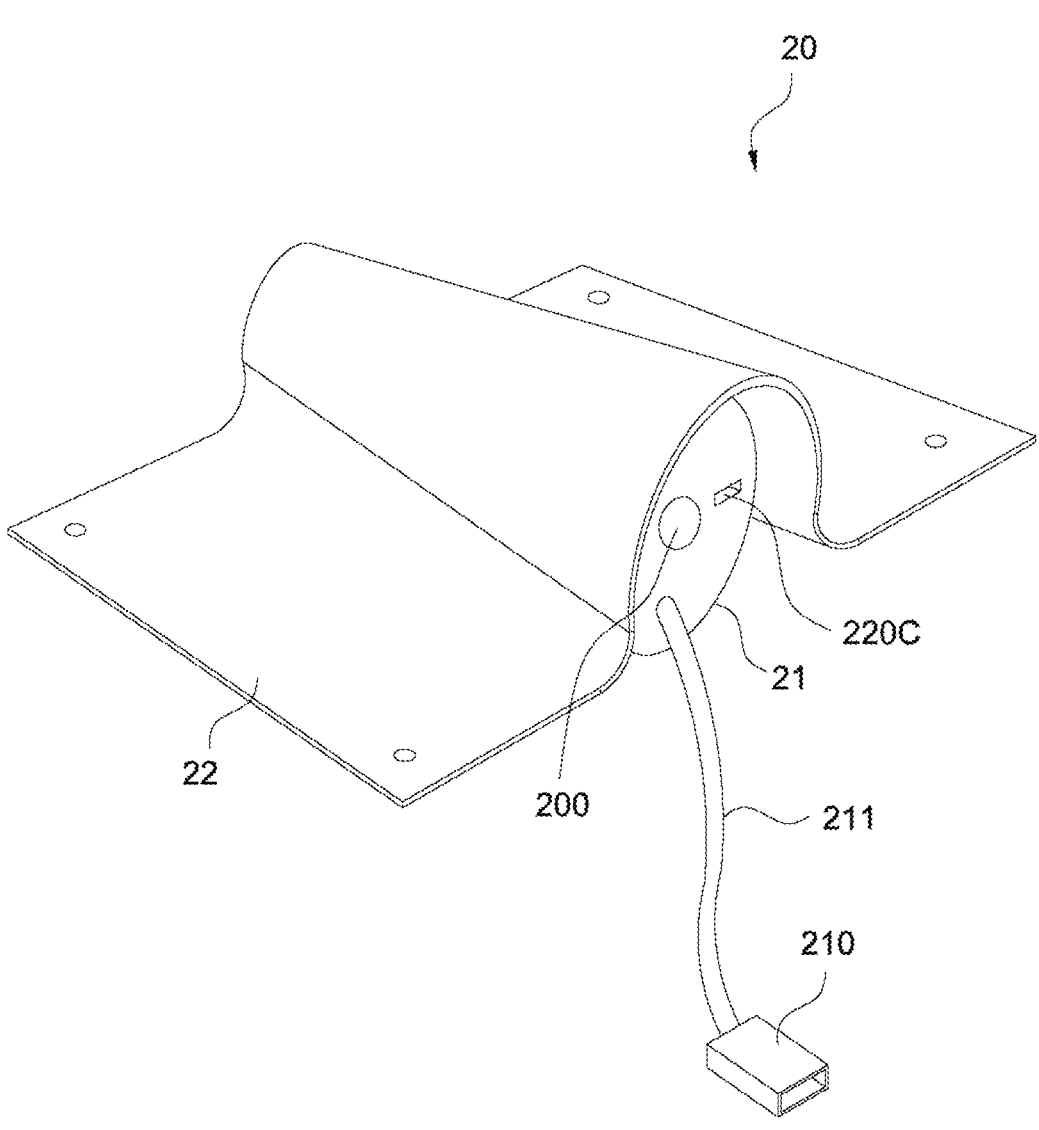

【Fig. 40】
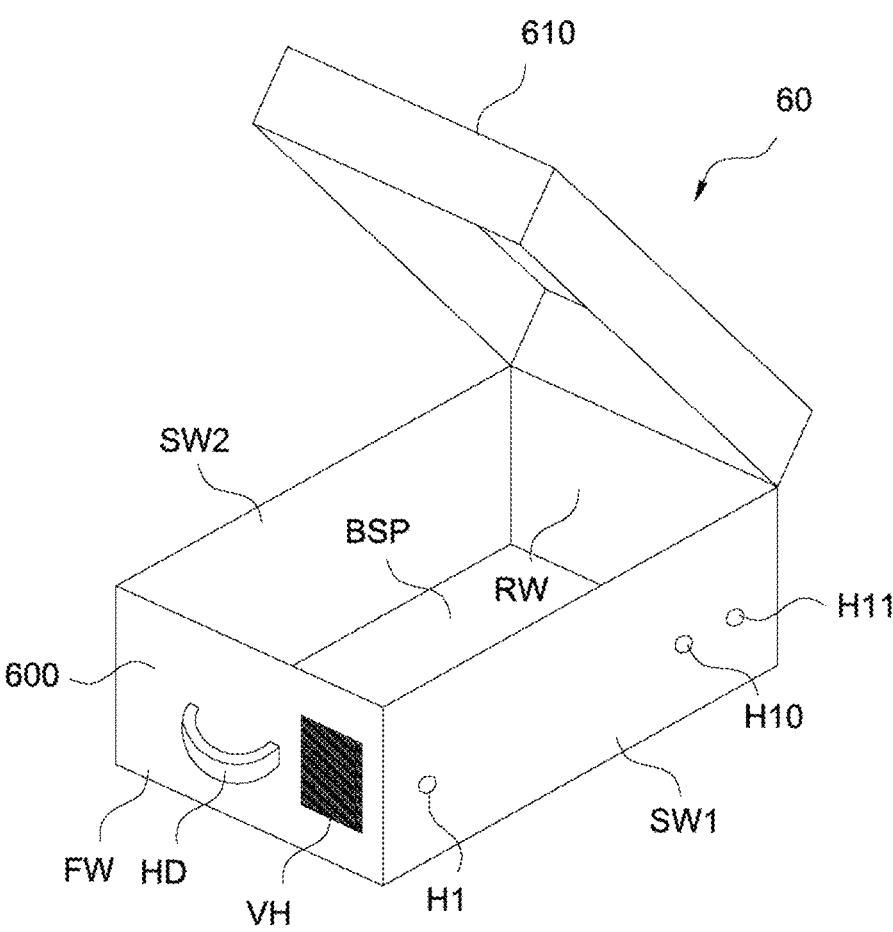

【Fig. 41】
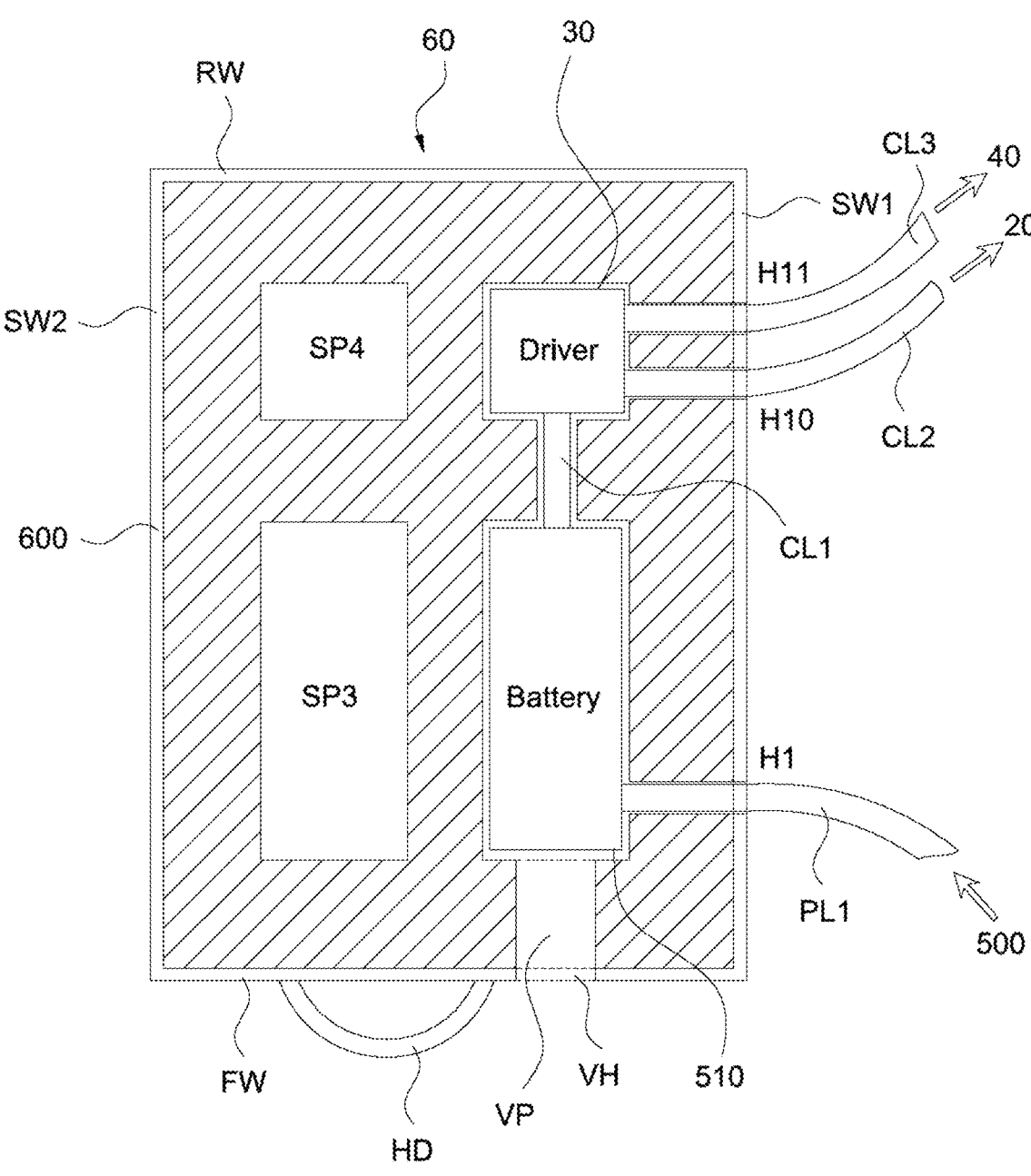

【Fig. 42】
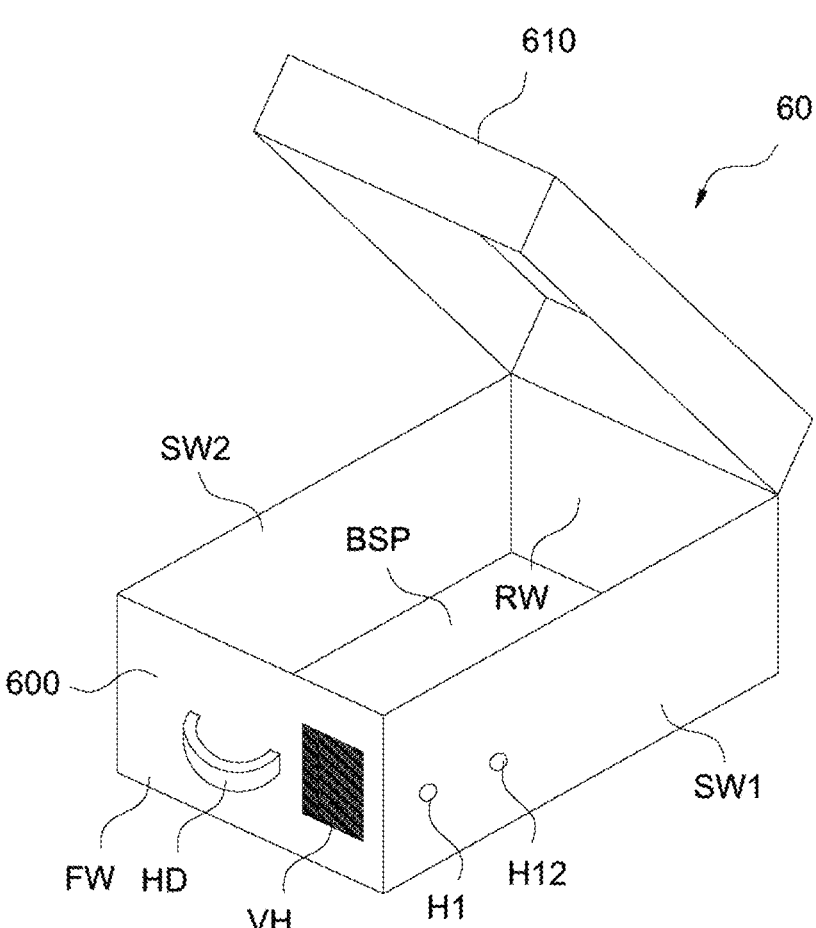

【Fig. 43】
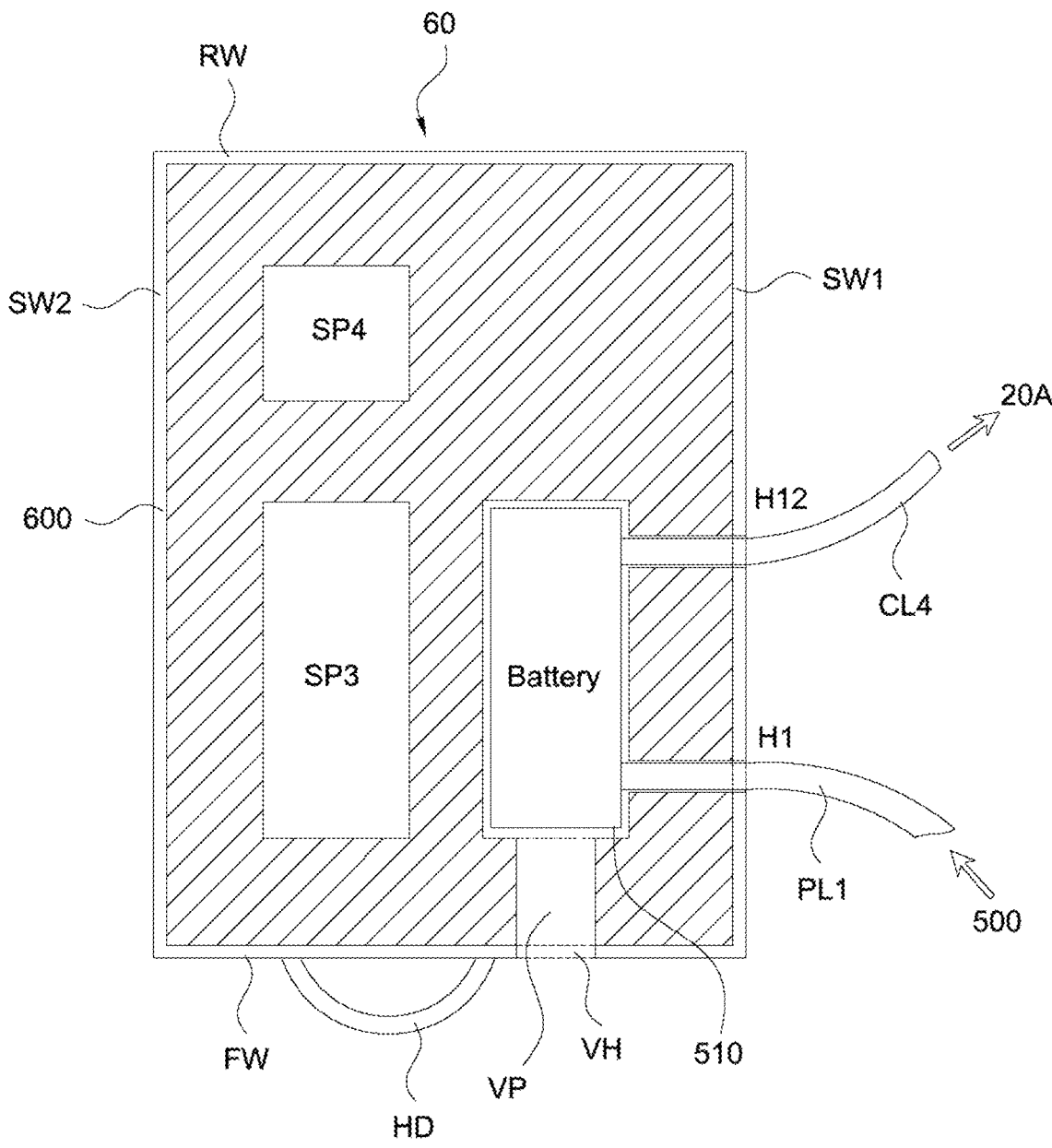

【Fig. 44】
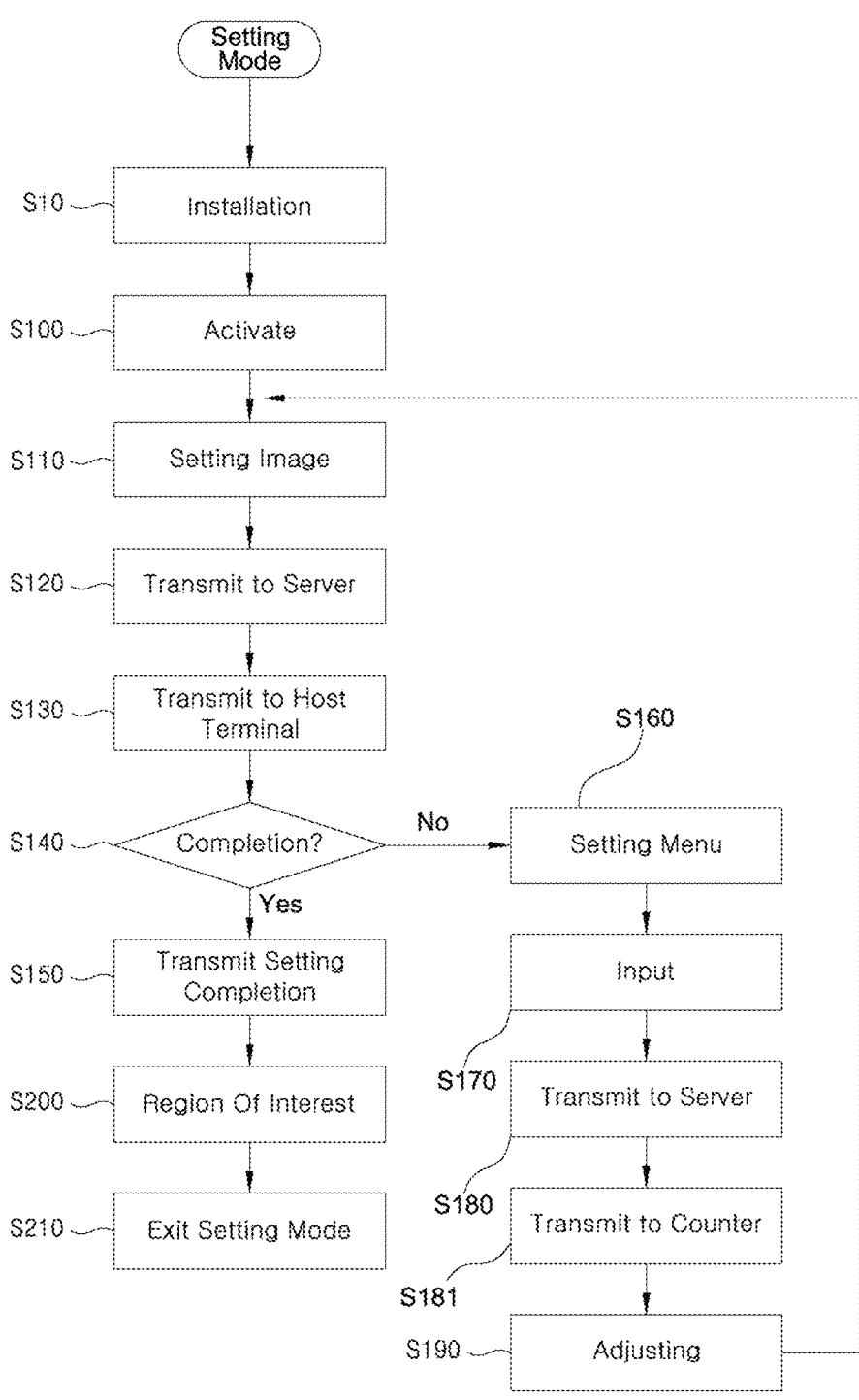

【Fig. 45】
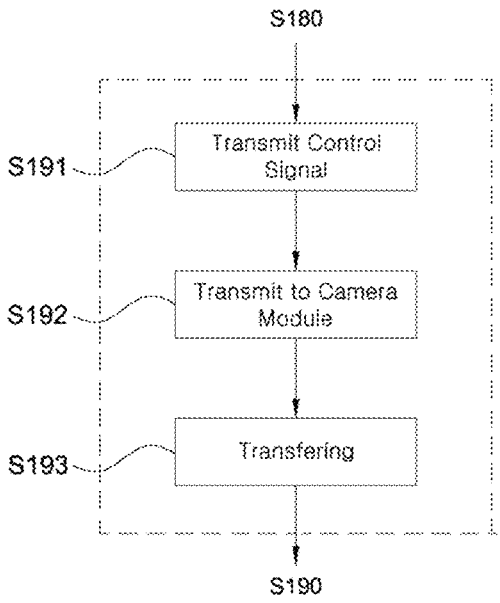
【Fig. 46】

【Fig. 47】
3
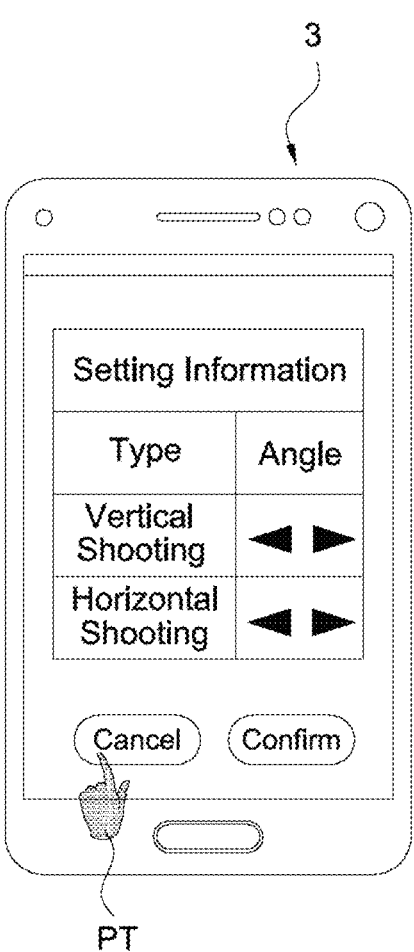
PT

【Fig. 48】
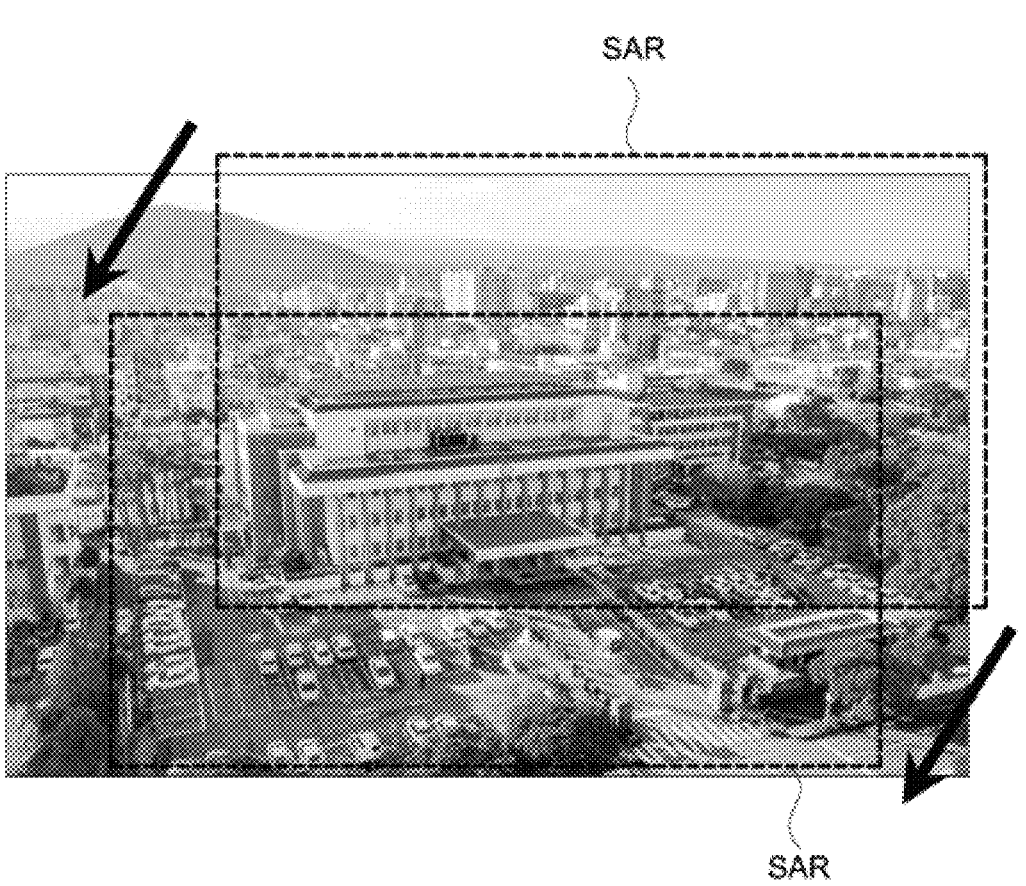

【Fig. 49】
STI
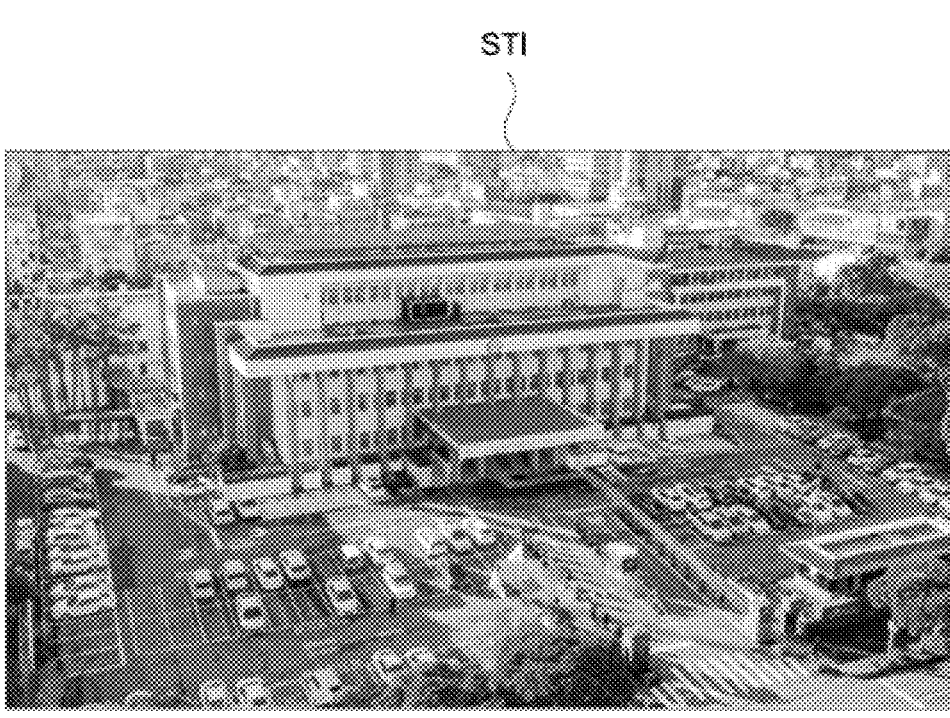

【Fig. 50】
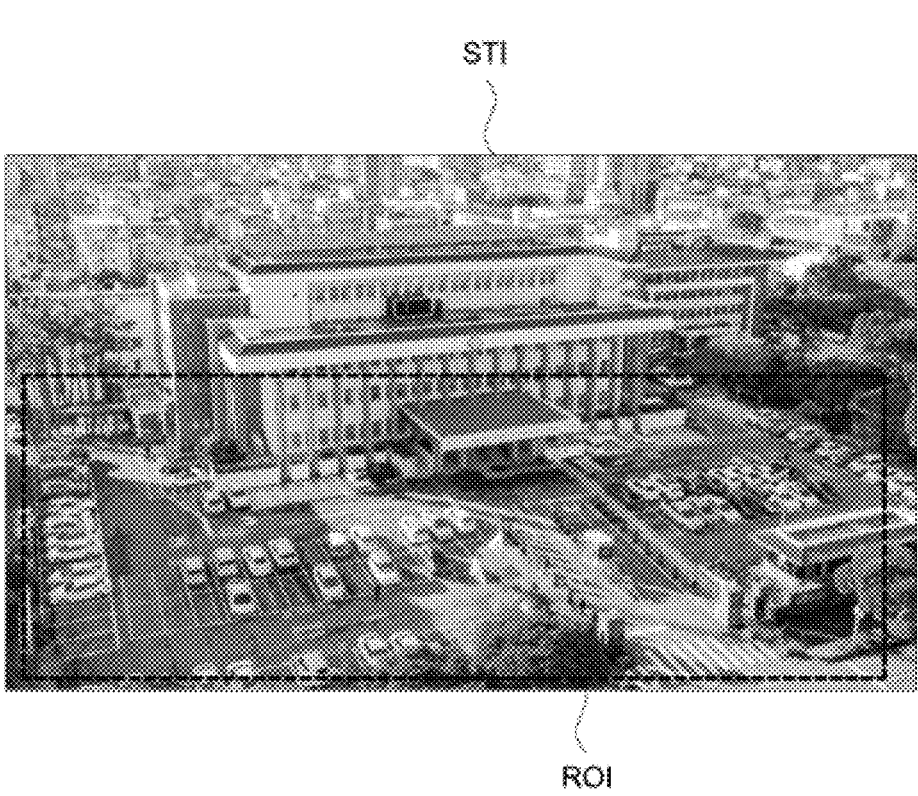
STI
ROI

【Fig. 51】
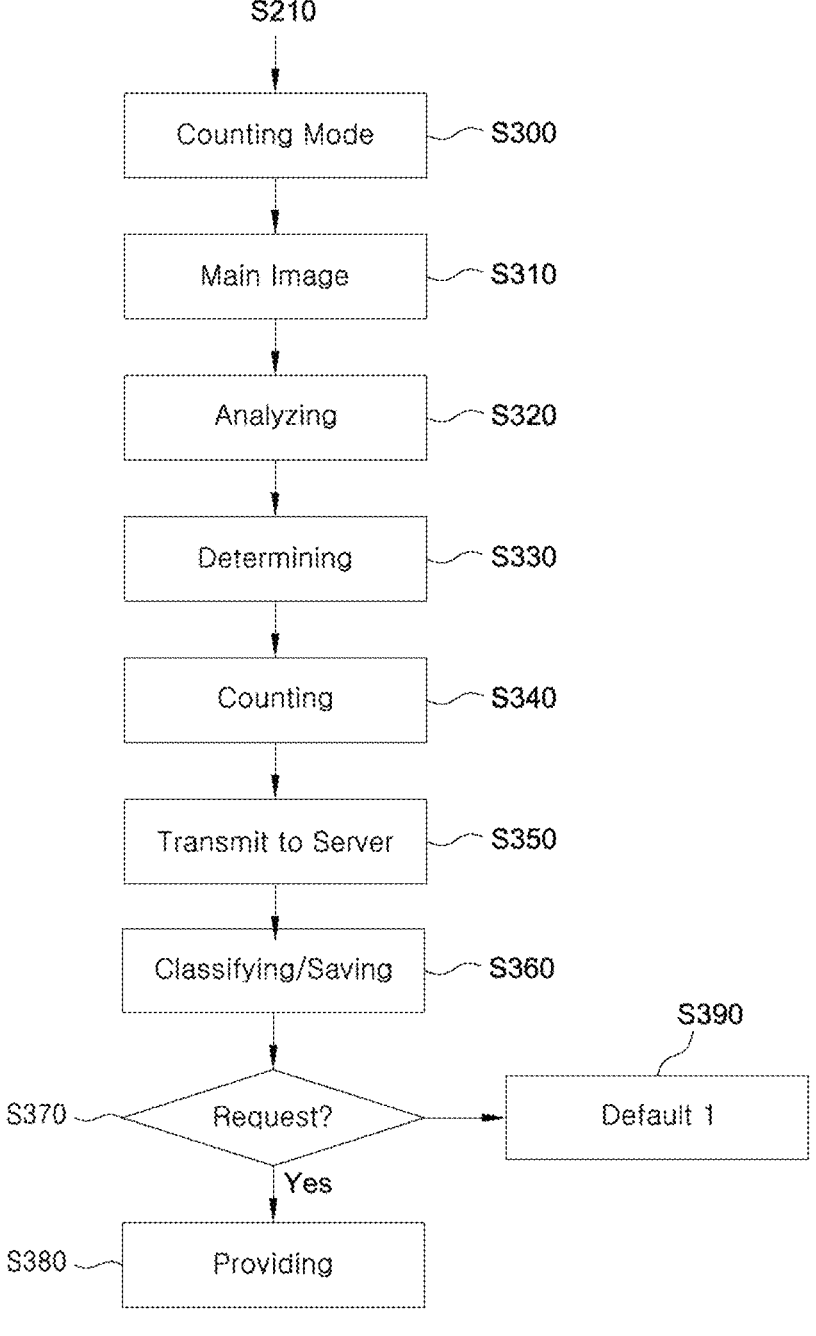

【Fig. 52】
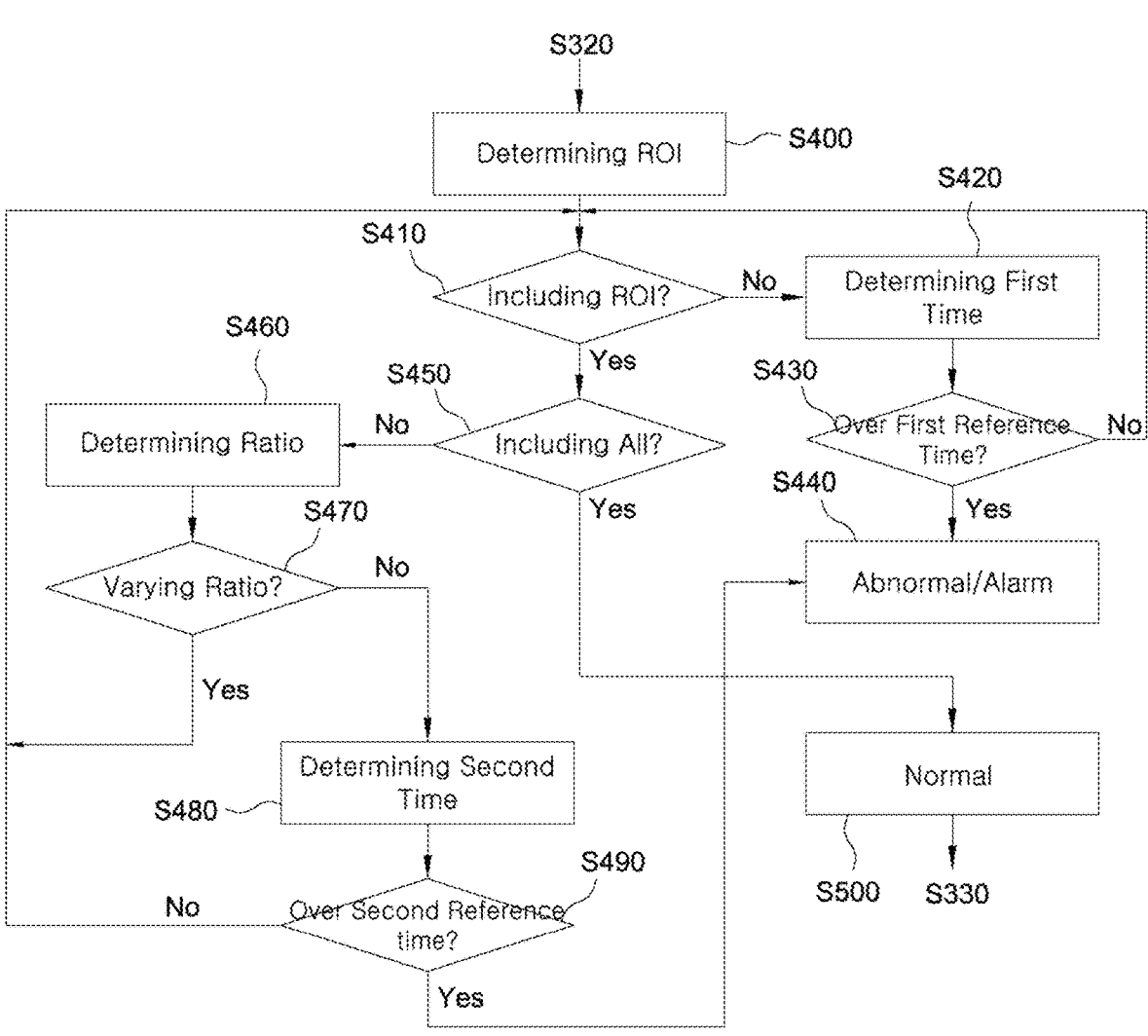

【Fig. 53】
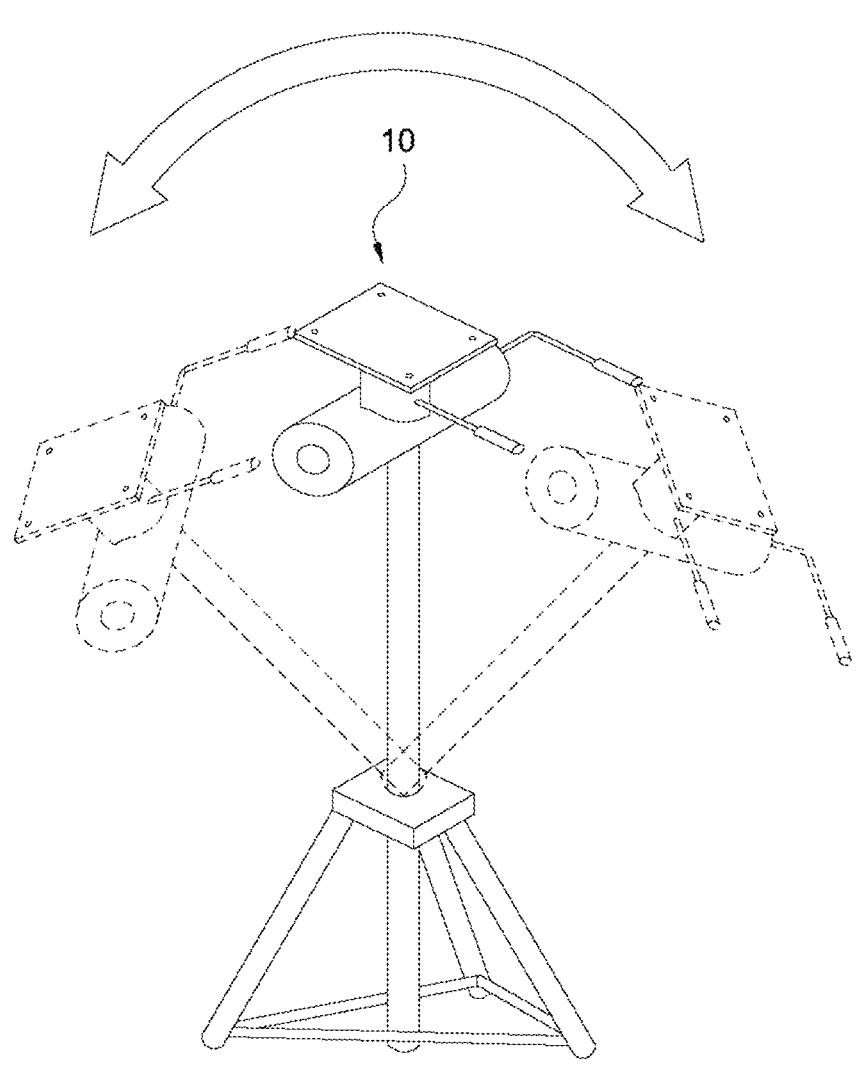

【Fig. 54】
MAI
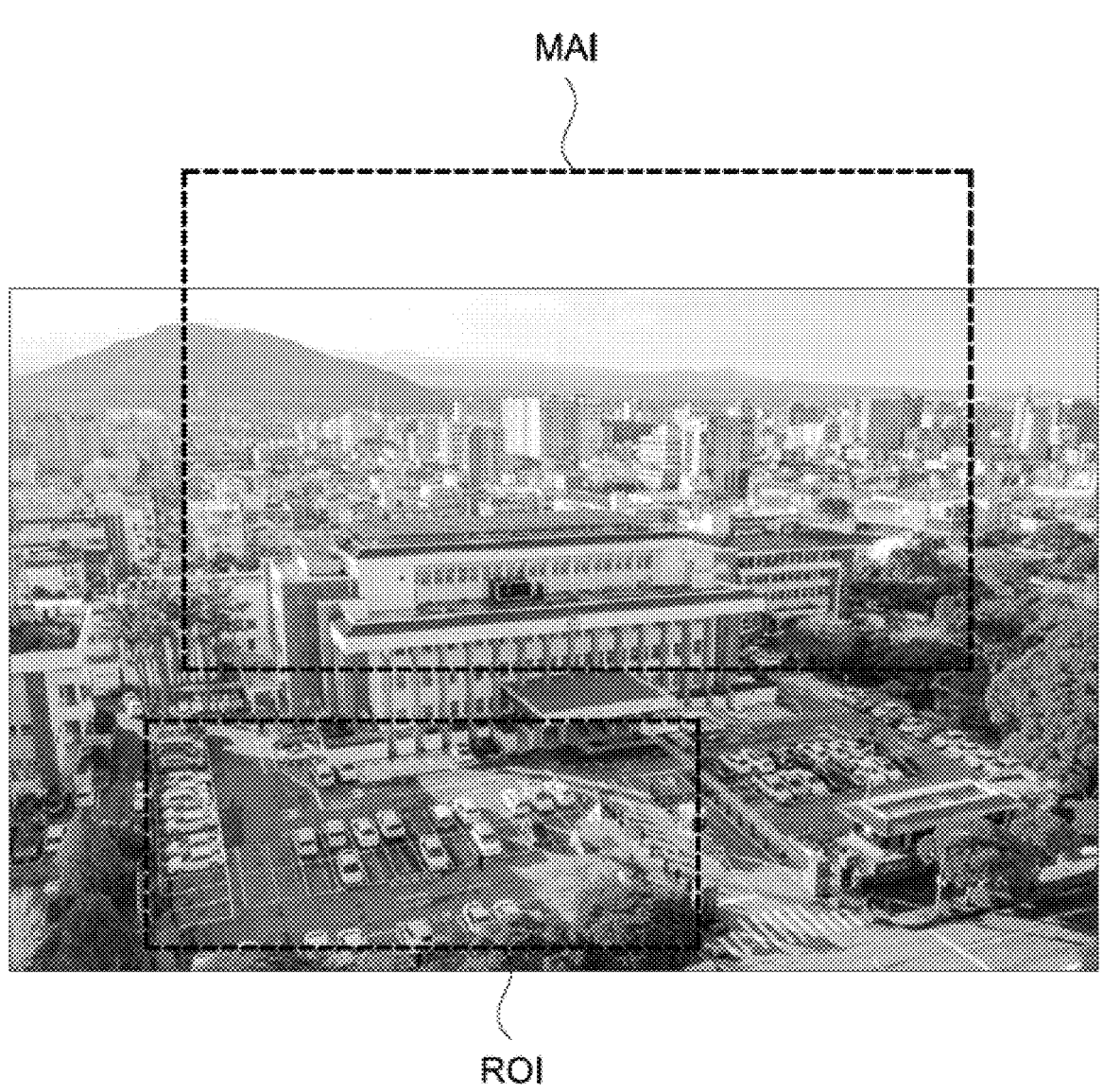
ROI

【Fig. 55A】
(A)
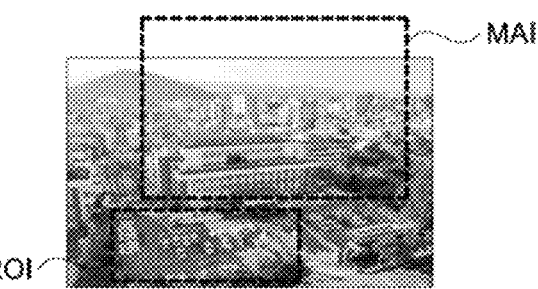
【Fig. 55B】
(B)
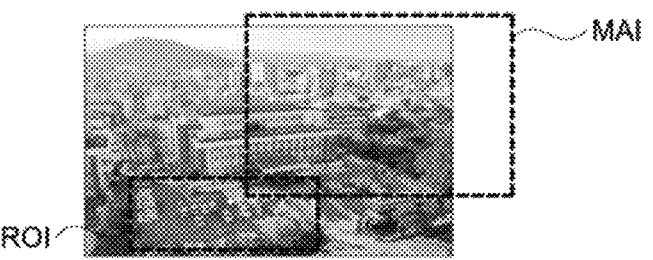
【Fig. 55C】
(C)
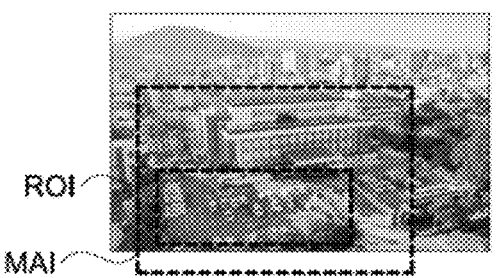
【Fig. 55D】
(D)
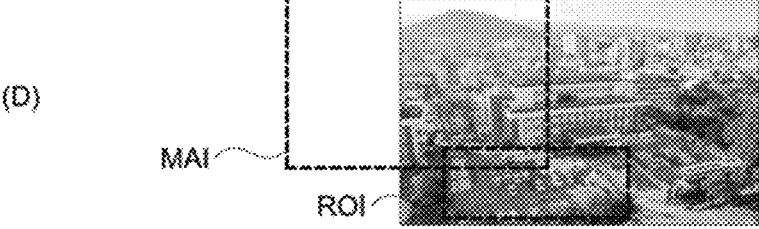

【Fig. 56】
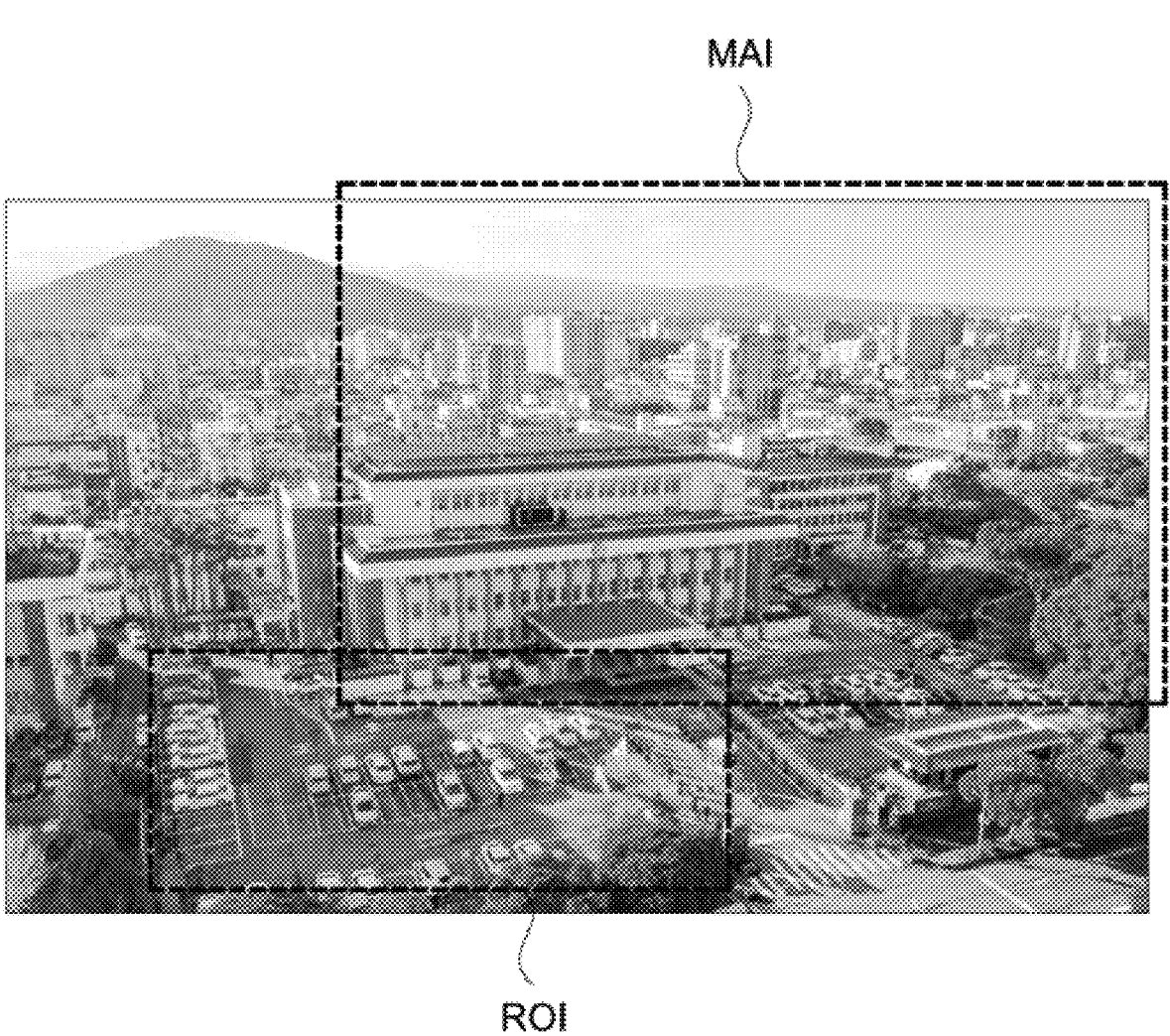

PORTABLE COUNTING APPARATUS FOR SMART CITY IMPLEMENTATION USING ARTIFICIAL INTELLIGENCE

TECHNICAL FIELD

Embodiments of the invention relate to portable counting apparatus for smart city implementation using artificial intelligence, counting system including the same, and counting method using the same.

DISCUSSION OF RELATED ART

These days, disasters such as typhoons, floods, and earthquakes occur frequently.

When such a disaster occurs, it is necessary to evacuate to a designated shelter. In order to manage the shelter efficiently, it is necessary to accurately determine the number of people and vehicles staying at the shelter.

Conventionally, a statistical method was used to infer the total number of people by directly counting the number of people or counting the number of people in the extracted sample. However, this method has problems in that it requires a lot of money in cities with large populations, takes a long time, and has low accuracy.

A counting device that automatically counts people or vehicles through artificial intelligence and is portable so that it can be used in necessary places will be a great help in implementing a smart city

SUMMARY OF INVENTION

The present invention is directed to portable counting apparatus, the apparatus comprising: a tripod; a camera module disposed on the tripod and takes images of a region of interest; a driver counting number of an objects corresponding to the region of interest by analyzing the image of the region of interest; a communicating module transmitting information of the number of the object corresponding to the region of interest to a server; a power supplying part supplying a power to at least one of the camera module, the driver and the communicating module; and a case part, wherein the power supplying part includes a solar cell part producing power using solar energy; and a battery storing the power produced by the solar cell part, wherein the case part includes a space inside to accommodate at least one of the battery and the driver, wherein the tripod includes a pillar part including a portion extended along a vertical direction; a mounting part located on a top of the pillar part; and a plate part including a hole through which the pillar part passes; wherein the camera module is disposed on the mounting part, wherein the plate part is located below the mounting part, wherein the communicating module is disposed on the plate part.

The present invention is directed to counting system, the system comprising: a counting part extracting information about number of an objects corresponding to a region of interest during a counting mode; a server receiving information about number of the objects corresponding to the region of interest from the counting part; a host terminal corresponding to a host user; and a guest terminal corresponding to a guest user, wherein the counting part takes a setting image of the region of interest during a setting mode, and transmit the setting image to the server, wherein the server transmits the setting image to the host terminal during the setting mode, wherein the server transmits the information about number of the objects corresponding to the region of interest to the guest terminal during the counting mode.

Advantageous Effects

The portable counting apparatus for smart city implementation using artificial intelligence according to the present invention, have the effect of easily and precisely determining the number of objects located in the region of interest even in situations where power is not provided.

Therefore, the patable counting apparatus according to the present invention can contribute to the implementation of smart city even in disaster situations where power is not supplied.

BRIEF DESCRIPTION OF DRAWINGS

FIG. 1 is a diagram for explaining the configuration of a counting system including a portable counting apparatus using artificial intelligence according to the present invention.

FIGS. 2 to 3 are diagrams schematically illustrating the configuration of a portable counting apparatus according to the present invention.

FIGS. 4, 5, 6, 7, 8, 9, 10, 11, 12A, 12B, 13, 14, 15, 16, 17 and FIG. 18 are diagrams for explaining the tripod and parts related thereto of the portable counting apparatus according to the present invention.

FIGS. 19A, 19B, 20, 21, 22A, 22B, 23, 24A, 24B. 25A, 25B, 25C, 26A, 26B, 27 and FIGS. 28A, 28B, 28C are diagrams for explaining the power supply unit and parts related thereto of the portable counting apparatus according to the present invention.

FIGS. 29, 30, 31, 32, 33, 34, 35, 36, 37, 38A, 38B, 39, 40, 41, 42, 43 are views for explaining the case portion and parts related thereto of the portable counting apparatus according to the present invention.

FIGS. 44, 45, 46, 47, 48, 49 and 50 are diagrams for explaining the setting mode and parts related thereto of the portable counting apparatus according to the present invention.

FIGS. 51, 52, 53, 54, 55A, 55B, 55C, 55D and 56 are diagrams for explaining the counting mode and parts related thereto of the portable counting apparatus according to the present invention.

DETAILED DESCRIPTION OF EXEMPLARY EMBODIMENTS

Hereinafter, embodiments of the present invention will be described in detail with reference to the accompanying drawings.

The present embodiments are provided to more completely describe the present invention to a person of ordinary skill in the art, in drawings, a shape of an element, a size of an element, and a spacing between elements may be exaggerated or reduced in order to emphasize a clearer explanation.

In addition, in descriptions of the present invention, when it is determined that related known technologies obvious to those skilled in the art may unnecessarily obscure a gist of the present invention, detailed descriptions thereof will be omitted.

FIG. 1 is a diagram for explaining the configuration of a counting system including a portable counting apparatus using artificial intelligence according to the present invention.

Looking at FIG. 1, the counting system (10S) including a portable counting apparatus using artificial intelligence according to the present invention includes at least one counting unit (Counter, 1) (can be referred to as a 'counting apparatus') and a server (2).

And the counting system (10S) may include a host terminal (3) that is a terminal corresponding to at least one host user.

Here, the host user may include a user who installs or manages the counting unit (1).

The counting system (10S) may include a terminal corresponding to at least one guest user, that is, a guest terminal (4).

A guest user may also be referred to as a user who connects to the server (2) to use the information collected by the counting apparatus (1).

The counting apparatus (1) can extract information about the number of objects in response to the region of interest (ROI) preset in the counting mode.

The object may include at least one of a person or a vehicle.

The region of interest (ROI) can correspond to a shelter where subjects can evacuate in a disaster situation.

The counting apparatus (1) can transmit the extracted information to the server (2).

The counting apparatus (1) can transmit the setting image taken in the setting mode before the counting mode to the server (2).

The server (2) can transmit the setting image received from the counting part (1) to the host terminal (3).

The server (2) can classify and store information about the number of objects corresponding to the region of interest transmitted from at least one counting part (1).

The server (2) can transmit information about the number of objects corresponding to the region of interest to at least one guest terminal (4).

The counting apparatus (1) can produce the necessary power using its own power supplying part (50, not shown) even without receiving power from the outside.

The power supply module (50) of the counting apparatus (1) can produce electricity using solar energy.

Accordingly, the counting apparatus (1) can determine the number of objects corresponding to a region of interest based on artificial intelligence learning even in situations where power is not provided.

In addition, the counting apparatus (1) can determine the number of objects corresponding to a region of interest even in an outdoor environment with insufficient infrastructure.

The counting apparatus (1) is portable.

The counting apparatus (1) can be called a portable counting apparatus (1).

The counting system (10S) can be used in disaster situations such as typhoons, floods, and earthquakes.

In a disaster situation, there may be a high possibility that power will not be supplied normally.

Additionally, in a disaster situation, the possibility of infrastructure loss may be high.

Considering this, it is recommended to use the counting system (10S) that includes the counting apparatus (1) that is portable in a disaster situation. Because the counting apparatus (1) can supply the necessary power using a battery, and can charge the battery using solar energy. It may be desirable.

In other words, the counting system (10S) according to the present invention can be of great help in implementing a smart city because it can automatically count people or vehicles through artificial intelligence regardless of the presence or absence of power supply at the necessary location.

Each part of the counting system (10S) will be described in detail below.

FIGS. 2 and 3 are diagrams for explaining the schematic configuration of a portable counting apparatus using artificial intelligence according to the present invention.

Looking at FIG. 2, the counting apparatus (1) may include a tripod (10), a camera module (20), a driver (30), a communicating module (40), and a power supply module (50).

The tripod (10) can support the camera module (20).

The tripod (10) is height adjustable.

The camera module 20 can capture images. For example, the camera module (20) can capture images of a region of interest (ROI).

The camera module (20) may be placed at the upper end of the tripod (10).

The camera module (20) can transmit the captured image to the driver (30).

The driver (30) can analyze the image received from the camera module (20) and determine the number of objects corresponding to the region of interest.

In detail, the driver (30) can use artificial intelligence to analyze the image obtained by the camera module (20) to determine the type of object located in the region of interest and count the number of identified objects.

Objects may include people and/or vehicles.

Then, the communicating module (40) can transmit information about the number of objects corresponding to the region of interest (ROI) to the server (2).

The power supply module (50) may supply power to at least one of the camera module (20), driver (30), tripod (10), or communicating module (40).

The power supply module (50) can produce and supply power using solar energy.

In FIG. 2, the power supply line (Power Line) supplied by the power supply module (50) is indicated by a dotted line.

Looking at FIG. 3, the driver (30) may include a controller (300), image analyzing part (310), object determining part (320), counting part (330), first interface (340), and memory (350).

The controller (300) can control the overall functions of the driver (30) and/or the counting apparatus (1).

For example, the controller (300) may control wireless communication of the communicating module (40), image shooting of the camera module (20), and/or adjustment of the shooting angle of the tripod (10).

The image analyzing part (310) can analyze the image captured by the camera module (20) using artificial intelligence under the control of the controller (300).

The object determining part (320) can use artificial intelligence to determine objects such as people and vehicles from images obtained by the camera module (20) under the control of the controller (300).

The counting part (330) can count the number of objects determined by the object determination unit 320 under the control of the controller (300).

The first interface (340) may provide a passage for connection between the driver (30) and other devices.

The memory (350) can store various programs and data necessary for driving the driver (30) and/or the counting apparatus (1) under the control of the controller (300).

FIGS. 4 to 18 are diagrams for explaining the tripod and related parts of the counting apparatus according to the present invention.

Hereinafter, the first direction (DR1) may intersect (perpendicularly) the second direction (DR2) and the third direction (DR3), and the second direction (DR2) may intersect (perpendicularly) the third direction (DR3).

Here, the first direction (DR1) and the second direction (DR2) may be collectively referred to as the horizontal direction (DRH).

Additionally, the third direction (DR3) can be referred to as the vertical direction (DRV).

Referring to FIGS. 4 to 6, the tripod (10) may include a pillar part (100), a plurality of leg parts (110), a mounting part (120), an angle adjuster (130), and a rotator (140).

The pillar part (100) may include a portion extending in the vertical direction (DRV).

A plurality of leg parts (110) may support the pillar part (100).

It may be located at the lower part of the pillar part (100) of the plurality of leg parts (110).

According to the expression 'tri' in tripod (10), the number of leg parts (110) can be three.

However, in the present invention, the tripod 10 may not be limited to having three legs.

The tripod (10) may further include a reinforcement part (112).

The reinforcement part (112) can be reinforced by connecting adjacent leg parts (110).

The tripod (10) may further include a joint part (111).

At least one leg part (110) may be connected to the joint portion (111).

The joint portion (111) may be located below the mounting part (120).

The joint part (111) may be connected to the pillar part (100).

The leg part (110) and the pillar part (100) may be connected at the joint part (111).

The mounting part (120) may be located at the upper end of the pillar part (100).

The camera module (20) may be placed on the mounting part (120).

In order to sufficiently secure the shooting range of the camera module (20), it may be desirable to set the overall height (D1) of the tripod (10) sufficiently high. More preferably, the overall height (D1) of the tripod (10) may be higher than or equal to a preset reference height.

Here, the reference height may be approximately 2 to 3 meters.

Preferably, the overall height (D1) of the tripod (10) may be 2 meters or more, and more preferably, the overall height (D1) of the tripod (10) may be 3 meters or more.

As shown in FIG. 5, the angle adjuster (130) can adjust the vertical angle of the mounting part (120) by swinging the mounting part (120).

Considering that the camera module (20) is placed on the mounting part (120), the angle adjuster (130) can be said to adjust the vertical shooting angle of the camera module (20).

The angle adjuster (130) may include a first lever (131) for manually adjusting the vertical angle of the mounting part (120).

As shown in FIG. 6, the rotator (140) can adjust the horizontal angle of the mounting part (120) by rotating the mounting part (120) in the horizontal direction (DRH).

Considering that the camera module (20) is disposed on the mounting part (120), the rotator (140) can be seen as controlling the horizontal shooting angle of the camera module (20).

The rotator (140) may include a second lever (141) for manually adjusting the horizontal angle of the mounting part (120).

Meanwhile, the angle adjuster (130) and rotator (140) may be automatically driven.

To this end, as shown in FIGS. 7 to 8, the angle adjuster (130) may include an angle adjusting motor (132), and the rotator (140) may include a rotating motor (142).

The angle adjusting motor (132) can automatically adjust the vertical angle of the mounting part (120) by rotating under the control of the controller (300) of the driver (30).

The rotating motor (142) can automatically adjust the horizontal angle of the mounting part (120) by rotating under the control of the controller (300) of the driver (30).

Looking at FIG. 8, the tripod 10 may further include a second interface (150).

The second interface (150) may provide a path for transmitting signals to the angle adjusting motor (132) and/or the rotating motor (142).

Looking at FIG. 9, the camera module (20) may include a camera body part (21) and a camera cover part (22).

The camera cover part (22) can cover and protect the camera body part (21).

The camera cover part (22) can prevent the camera body part (21) from being damaged by snow, rain, etc.

The mounting part (120) may include at least one first fastening hole (FH1).

The camera cover part (22) may include at least one second fastening hole (FH2) corresponding to the first fastening hole (FH1).

A fastening means (FM) such as a screw can connect the camera module (20) to the mounting part (120) through the first fastening hole (FH1) and the second fastening hole (FH2).

The camera cover part (22) may include resin or plastic material.

The camera body part (21) may include the camera part (200), middle connector (210), third interface (220), and first power port (230).

The camera part (200) can capture images.

One end of the middle cable (211) can be connected to the camera body part (21).

The middle connector (210) may be connected to the other end of the middle cable (211).

In addition, the middle connector (210) can be connected to the second interface (150) of the tripod (10).

Power can be supplied from the camera body part (21) to the tripod (10) through the middle cable (211) and middle connector (210).

In addition, a Vertical Control Signal for automatically adjusting the vertical angle of the mounting part (120) can be transmitted from the camera body part (21) to the tripod (10) through the middle cable (211) and middle connector (210).

In addition, a Horizontal Control Signal can be transmitted from the camera body part (21) to the tripod (10) through the middle cable (211) and middle connector (210) to automatically adjust the horizontal angle of the mounting part (120).

The method of adjusting the vertical angle and/or horizontal angle of the mounting part (120) can be performed in the initial setting mode. The setting mode will be explained in detail later.

The data amount of the vertical control signal and the horizontal control signal may be relatively small.

The vertical angle and/or horizontal angle of the mounting part (120) can be adjusted while the camera module (20) is mounted on the mounting part (120)

Considering this, the angle adjusting motor (132) and rotating motor (142) of the tripod (10) may not directly receive the necessary power, vertical control signal, and/or horizontal control signal from the driver (30).

In this case, power and the signals may be transmitted from the camera module (20). Then, the configuration of the counting apparatus (1) can be simplified.

The camera body part (200) can receive a camera control signal for operating the camera body part (200) from the driver (30) through the third interface (220).

In addition, the camera body part (200) can transmit the captured image to the driver (30) through the third interface (220).

The camera body part (200) can receive a vertical control signal and/or a horizontal control signal from the driver (30) through the third interface (220).

The camera body part (200) can transmit the vertical control signal and/or horizontal control signal received from the driver (30) to the tripod (10) through the middle cable (211) and middle connector (210).

The camera body part (200) can receive the power required to drive the camera body part (200), the angle adjusting motor (132), and/or the rotating motor (142) through the first power port (230).

In addition, the camera body part (200) can transmit the supplied power to the angle adjusting motor (132) and/or rotating motor (142) of the tripod (10) through the middle cable (211) and middle connector (210).

Looking at FIG. 10, the pillar part (100) may include a plurality of sub pillars (101).

The plurality of sub pillars (101) may include a portion extending in the vertical direction (DRV).

In addition, the pillar part (100) may include at least one plate part (102).

The plate part (102) can improve the bearing capacity of the pillar part (100).

The plate part (102) may include at least one pillar hole (103) through which the sub pillar 101 passes.

The plate part (102) may be located below the mounting part (120). In detail, the plate part (102) may be located between the mounting part (120) and the leg part (110).

Alternatively, the plate part (102) may be located between the joint part (111) and the mounting part (120).

The communicating module (40) may be located at the bottom of the mounting part (120).'

In detail, as shown in FIG. 11, the communicating module (40) may be located in the plate part (102).

In this case, the weight burden on the pillar part (100) can be reduced.

If the weight burden applied to the tripod (10) is excessively large, the pillar part (100) may be excessively bent. In this case, the camera module (20) may not be able to capture images smoothly.

As in the present invention, when the communicating module (40) is placed on the plate part (102), bending of the pillar part (100) can be suppressed while making the vertical position of the communicating module (40) sufficiently high.

As shown in FIGS. 12(A) to (B), the width (D2) in the longitudinal direction (DRL) of the plate part (102) may be larger than the width (D3) in the width direction (DRW).

In this case, the plate part (102) can stably support the communicating module (40).

Here, the longitudinal direction (DRL) and width direction (DRW) are arbitrarily set to facilitate understanding of the plate part (102).

The longitudinal direction (DRL) and the width direction (DRW) can be said to be part of the horizontal direction (DRH).

The plate part (102) may further include a holder part (104) for fixing the communicating module (40).

A plurality of pillar holes (103) may be formed in the first area (AR1) of the plate part (102).

The holder part (104) may be located in the second area (AR2) adjacent to the first area (AR1) in the longitudinal direction (DRL).

The holder part (104) may include a first sub holder (104*a*) and a second sub holder (104*b*).

The first sub holder (104*a*) and the second sub-holder (104*b*) may be adjacent to each other in the longitudinal direction (DRL).

The first sub holder (104*a*) may include a first vertical part (104*a*1) and a first horizontal part (104*a*2).

The first vertical part (104*a*1) includes a part extending in the vertical direction (DRV) and may be connected to the main body of the plate part (102).

The first horizontal part (104*a*2) may include a part extending from the end of the first vertical part (104*a*1) in the longitudinal direction (DRL) toward the second sub holder (104*b*).

The second sub holder (104*b*) may include a second vertical part (104*b*1) and a second horizontal part (104*b*2).

The second vertical part (104*b*1) includes a part extending in the vertical direction (DRV) and may be connected to the main body of the plate part (102).

The second horizontal part (104*b*2) may include a part extending from the end of the second vertical part (104*b*1) in the longitudinal direction (DRL) toward the first sub holder (104*a*).

The first sub holder (104*a*) and the second sub holder (104*b*) may be rail types.

The thickness (D4) of the main body of the plate part (102) in the vertical direction (DRV) may be smaller than the width (D3) of the plate part (102) in the width direction (DRW).

Looking at FIG. 13, the communicating module (40) may be connected to the holder part (104).

To this end, the communicating module 40 may include a first protruding part (410) and a second protruding part (411) that protrude in the longitudinal direction (DRL).

The first protruding part (410) and the second protruding part (411) may protrude in opposite directions.

The first protruding part (410) may correspond to the space between the first vertical part (104*a*1) and the first horizontal part (104*a*2).

The second protruding part (411) may correspond to the space between the second vertical part (104*b*1) and the second horizontal part (104*b*2).

The communicating module (40) may be connected to the first sub holder (104*a*) and the second sub holder (104*b*) by sliding in the width direction (DRW).

Looking at FIGS. 14 and 15, the first area (AR1) and the second area (AR2) of the plate part (102) may intersect at a predetermined angle.

For example, the first area (AR1) and the second area (AR2) may be orthogonal to each other.

The second area (AR2) may extend vertically (DRV) from the end of the first area (AR1).

The communicating module (40) may be disposed on the plate part (102) in an inclined form.

In this case, the size of the tripod (10) in the horizontal direction (DRH) can be reduced.

As shown in FIG. 16, the pillar part (100) may include a single pillar.

In this case, a single pillar hole (103C) through which a single pillar passes may be formed in the first area (AR1) of the plate part (102).

The pillar part (100) may pass through the single pillar hole (103C).

Looking at FIG. 17, the communicating module (40) may be disposed in the joint portion (111).

In this case, the joint portion (111) may include a first area (111*a*) and a second area (111*b*).

At least one pillar hole (103) or the single pillar hole (103C) through which the pillar part (100) passes may be formed in the first area (111*a*) of the joint part (111).

The holder part (104) may be placed in the second area (111*b*) of the joint portion (111).

The leg part (110) and the pillar part (100) may be connected in the first area (111*a*) of the joint portion (111).

Looking at FIG. 18, the second area (111*b*) of the joint portion (111) may intersect (or be perpendicular to) the first area (111*a*).

The description of the joint portion (111) including the first area (111*a*) and the second area (111*b*) may be replaced with the description of FIGS. 11 to 16 above.

Below, the power supply module (50) will be described in detail.

FIGS. 19 to 28 are diagrams for explaining the power supply module and parts related thereto of the portable counting apparatus according to the present invention. Hereinafter, descriptions of parts described in detail above may be omitted.

Looking at (A) and (B) of FIGS. 19, the power supply module (50) may include a solar cell part (500) and a battery (510).

The solar cell part (500) can produce electricity using solar energy.

The battery (510) can store the power produced by the solar cell part (500).

The battery (510) can supply the stored power to the tripod (10), the camera module (20), the driver (30), and/or communicating module (40).

The solar cell part (500) may include a plurality of solar plates (501) including a plurality of solar cells For example, the solar cell part (500) includes a first solar plate (501*a*), a second solar plate (501*b*), a third solar plate (501*c*), and a fourth solar plate (501*d*).

The power produced by the solar plates (501, 501*a*, 501*b*, 501*c*, 501*d*) can be supplied to the battery (510) through the first power line (PL1).

The number of first power lines (PL1) may vary depending on the number of solar plates (501).

For example, the first power line (PL1) may include a 1-1 power line (PL1*a*) and a 1-2 power line (PL1*b*).

The solar cell part (500) may further include a solar bag (502) that accommodates the plurality of solar plates (501).

As shown in FIGS. 20 to 21, the solar bag (502) may include at least one accepting part (502*a*1, 502*a*2, 502*a*3, 502*a*4) for receiving each solar plate (501).

For example, the solar bag (502) has a first accepting part (502*a*1), a second accepting part (502*a*2), a third accepting part (502*a*3), and a fourth accepting part. (502*a*4)

For example, the solar bag (502) may include a first accepting part (502*a*1), a second accepting part (502*a*2), a third accepting part (502*a*3), and a fourth accepting part (502*a*4).

Each accepting part (502*a*1, 502*a*2, 502*a*3, 502*a*4) can be open on one side and blocked on the other side.

The solar plate (501) can be inserted into one open side of the accepting part (502*a*1, 502*a*2, 502*a*3, 502*a*4).

Each accepting part (502*a*1, 502*a*2, 502*a*3, 502*a*4) may include a front part (FP) and a rear part (RP) opposite the front part (FP).

An accepting space (AS) may be provided between the front part (FP) and the rear part (RP).

The solar plate (501) can be accommodated in the accepting space (AS).

The light transmittance of the front part (FP) may be greater than that of the rear part (RP).

The front part (FP) may include a transparent resin material.

The rear portion (RP) may include a fabric material.

Multiple accepting parts (502*a*1, 502*a*2, 502*a*3, 502*a*4) can be connected to each other.

The first accepting part (502*a*1), the second accepting part (502*a*2), the third accepting part (502*a*3), and the fourth accepting part (502*a*4) may include the first side (S1) and the second side (S2) opposite to the first side (S1).

The second side (S2) of the first accepting part (502*a*1) may be connected to the first side (S1) of the second accepting part (502*a*2) so as to be foldable.

The second side (S2) of the second accepting part (502*a*2) may be foldably connected to the first side (S1) of the third accepting part (502*a*3).

The second side (S2) of the third accepting part (502*a*3) may be foldably connected to the first side (S1) of the fourth accepting part (502*a*4).

Looking at FIG. 22, the solar bag (502) may further include a pocket (502*b*).

The pocket (502*b*) may be placed on the rear part (RP) of at least one accepting part (502*a*1, 502*a*2, 502*a*3, 502*a*4).

For example, as shown in (A) of FIG. 22, the pocket (502*b*) may be placed on the rear part (RP) of the second accepting part (502*a*2) and/or the third accepting part (502*a*3).

The pocket (502*b*) can accommodate the first power line (PL1) for transmitting power produced by the solar cell part (500) using solar energy to the battery (510).

As shown in (B) of FIG. 22, it may be possible for the pocket (502*b*) to be placed on the rear part (RP) of the first accepting part (502*a*1).

Alternatively, the pocket (502*b*) is placed on the rear part (RP) of the third accepting part (502*a*3), or the pocket (502*b*) is placed on the rear part (RP) of each of the second accepting part (502*a*2) and the third accepting part (502*a*3). It may also be possible to place.

Looking at FIGS. 23 and 24, at least one first bag hole (BH1) may be formed in the accepting part (502*a*1, 502*a*2, 502*a*3, 502*a*4) at a position corresponding to the pocket (502*b*).

For example, at least one first bag hole (BH1) may be formed in the rear portion (RP) of the second accepting part (502*a*2).

The first power line (PL1) can electrically connect the battery (510) and the solar cell part (500) by passing through the first bag hole (BH1).

The pocket (502*b*) may include a pocket entrance portion (502*b*1). The pocket entrance portion (502*b*1) may include a zipper.

As shown in (A) of FIG. 24, in a state where the first power line (PL1) electrically connects the battery (510) and the solar cell part (500), the 1-1 power line (PL1a) and the 1-2 power lines (PL1b) may pass through different first bag holes (BH1).

In addition, the 1-1 power line (PL1a) and the 1-2 power line (PL1b) may pass through the bag entrance portion (502b1).

Alternatively, as shown in (B) of FIG. 24, in a state where the first power line (PL1) electrically connects the battery (510) and the solar cell part (500), the 1-1 power line (PL1a) and the 1-2 The power line (PL1b) can pass through the bag entrance portion (502b1) in a bundled state.

The solar bag (502) can be folded in a predetermined pattern.

For example, as shown in (A) of FIG. 25, the first accepting part (502a1) and the second accepting part (502a2) are folded to overlap each other, and the third accepting part (502a3) and the fourth accepting part (502a4) are folded to overlap each other.

Thereafter, as shown in (B) of FIG. 25, the first accepting part (502a1) and the fourth accepting part (502a4) can be folded so that they are adjacent to each other and overlap.

Then, as shown in (C) of FIG. 25, the first accepting part (502a1), the second accepting part (502a2), the third accepting part (502a3), and the fourth accepting part (502a4) are folded so as to overlap.

In this case, the solar cell part (500) can be easily carried.

The solar bag (502) can be folded in another way.

For example, as shown in (A) of FIG. 26, the front part (FP) of the first accepting part (502a1) and the front part (FP) of the second accepting part (502a2) are folded to face each other, and the front part (FP) of the third accepting part (502a3) and the front part (FP) of the fourth accepting part (502a4) are folded to face each other.

Thereafter, as shown in (B) of FIG. 26, the rear portion (RP) of the second accepting part (502a2) and the rear portion (RP) of the third accepting part (502a3) can be folded to face each other.

The solar cell part (500) may further include a constraint part (504).

One end of the constraint part (504) can be connected to the rear part (RP) of the accepting part (502a1, 502a2, 502a3, 502a4).

The other end of the constraint part (504) may be connected to the end of the pedestal (503).

As shown in (A) of FIG. 28, the end of the pedestal (503) can be spaced sufficiently far away from the rear part (RP) of the accepting part (502a1, 502a2, 502a3, 502a4).

In this case, it can be said that the pedestal (503) is unfolded, and the solar cell part (500) can be stably erected.

As shown in FIGS. 28(B) and (C), the pedestal (503) may be folded so that the end of the pedestal part 503 is close to the rear part (RP) of the accepting part (502a1, 502a2, 502a3, 502a4).

In this case, portability can be improved by reducing the size of the solar cell part (500).

Below, case part (60) will be described in detail.

FIGS. 29 to 43 are diagrams for explaining the case part and parts related thereto of the potable counting apparatus according to the present invention. Hereinafter, descriptions of parts described in detail above may be omitted.

Looking at FIG. 29, the counting apparatus (1) may further include a case part (60).

The Battery (510) may be placed within the case part (60).

Case part (60) may include body part (600) and cover part (610).

The cover part (610) can cover the body part (600) on top.

The body part (600) may include a first side wall (SW1), a second side wall (SW2), a front wall (FW), a rear wall (RW), and a bottom surface (BSP).

The first side wall (SW1) and the second side wall (SW2) may face each other.

The front wall (FW) can be connected to the first side wall (SW1) and the second side wall (SW2).

The rear wall (RW) is connected to the first side wall (SW1) and the second side wall (SW2) and may be opposed to the front wall (FW).

The bottom surface (BSP) may face the cover part (610).

At least one hole may be formed in the first side wall (SW1) and/or the second side wall (SW2).

For example, a plurality of holes (H1 to H5) may be formed in the first side wall (SW1).

A hole may not be formed in the second side wall (SW2).

The case part (60) may be a portable carrier type.

The case part (60) may further include a handle (HD).

The handle unit (HD) may be placed on the front wall (FW).

The body part 600 may further include a ventilation hole (VH).

The ventilation hole (VH) may be formed in the front wall (FW).

Referring to FIG. 30, a buffer part (B620) may be disposed in the case part (60) to provide a first space (SP1), a second space (SP2), a third space (SP3), and a fourth space (SP4).

The buffer part (620) may include a resin material such as soft and elastic styrofoam.

Looking at FIGS. 31 and 32, the battery (510) may be placed in the first space (SP1), and the driver (30) may be placed in the second space (SP2).

With the battery (510) placed in the first space (SP1) and the driver (30) placed in the second space (SP2), the driver (30), the camera module (20), the tripod (10) and/or the communicating module (40) can be operated.

The third space (SP3) may correspond to the camera module (20).

The fourth space (SP4) may correspond to the communicating module (40).

The camera module (20) can be stored in the third space (SP3) when not in use, and the communicating module (40) can be stored in the fourth space (SP4) when not in use.

The first power line (PL1) can pass through the first hole (H1).

The second power line (PL2) can pass through the second hole (H2).

The second power line (PL2) can transfer power from the battery (510) to the camera module (20).

The second power line (PL2) may be connected to the first power port (230) described in FIG. 9 above.

The third power line (PL3) can pass through the third hole (H3).

The third power line (PL3) can transfer power from the battery (510) to the communicating module (40).

In the case part (60), a fourth power line (PL4) may be located between the driver (30) and the battery (510).

A fourth power line (PL4) can transfer power from the battery (510) to the driver (30).

The first data line (DL1) may pass through the fourth hole (H4).

The driver (30) can communicate with the camera module (20) through the first data line (DL1).

The driver (30) can transmit a signal to control the camera module (20) to the camera module (20).

The driver (30) can transmit a vertical control signal and/or a horizontal control signal to the camera module (20) through the first data line (DL1).

The camera module (20) can transmit captured images to the driver 30 through the first data line (DL1).

The first data line (DL1) may be connected to the third interface (220) described above in FIG. 9.

The second data line (DL2) may pass through the fifth hole (115).

The driver (30) can communicate with the communicating module (40) through the second data line (DL2).

The driver (30) may transmit a signal for controlling the communicating module (40) to the communicating module (40) through the second data line (DL2).

The driver (30) may transmit information about the number of objects corresponding to the region of interest (ROI) determined by the driver (30) to the communicating module (40) through the second data line (DL2).

Then, the communicating module (40) can transmit information about the number of objects corresponding to the region of interest (ROI) to the server (2).

The communicating module (40) can transmit information and data received from the server (2) to the driver (30) through the second data line (DL2).

Alternatively, the driver (30) may transmit the images the communicating module (40) through the second data line (DL2).

Then, the communicating module (40) can transmit the images to the server (2).

Within the case part (60), a third data line (DL3) may be located between the driver (30) and the battery (510).

The third data line (DL3) may provide a path for data communication between the battery (510) and the driver (30).

Stable operation of the counting apparatus (1) may be possible even when the case part (60) is closed, that is, when the cover part (610) covers the body part (600).

In a disaster situation, there is a high possibility that the environment at the location for installing the counting apparatus (1) will not be clean or unstable.

Considering this, it may be more desirable to operate the counting apparatus (1) with the case part (60) closed.

If the counting apparatus (1) is operated with the case part (60) closed, contamination or malfunction caused by water or foreign substances can be prevented.

The case part (60) may have a waterproof function.

If the driver (30) is placed in the case part (60) separately from the camera module (20), the weight burden on the tripod (1) can be reduced.

Looking at FIG. 33, the buffer part (620) may further include a ventilation passage (VP).

The ventilation passage (VP) may be located between the battery (510) and the ventilation hole (VH).

External air is supplied to the battery (510) through ventilation passage (VP) and ventilation hole (VH), thereby preventing the temperature of the battery (510) from increasing excessively.

Looking at FIGS. 34 and 35, the case part (60) may further include a hole cover (630).

The hole cover (630) is placed on the side wall of the case part (60) and can cover the first hole (H1), the second hole (H2), the third hole (H3), the fourth hole (H4), and the fifth hole (H5).

The hole cover (630) can be said to be a type of awning.

The hole cover (630) can prevent foreign substances such as water and dust from penetrating into the case part (60) in a disaster situation.

Looking at FIG. 36, the driver (30) and the camera module (20) can be integrated into one integrated module (20A).

In this case, the configuration of the counting apparatus (1) can be simplified.

The integrated module (20A), which includes the functions of the driver (30) and the camera module (20), can be placed on the mounting part (120) of the tripod (10).

When the driver (30) and the camera module (20) are integrated into one integrated module (20A), as shown in FIG. 37, the second space (SP2) for the driver (30) in the case part (60) will be omitted.

In addition, the third space (SP3) for the camera module (20) can be replaced with the fifth space (SP5) for the integrated module (20A).

Referring to FIG. 38, a sixth hole (H6) and a seventh hole (H7) may be formed in the body part (600).

In addition, the second hole (H2), fourth hole (H4), and fifth hole (H5) may be omitted in the body part (600).

The fifth power line (PL5) may pass through the sixth hole (H6).

The fifth power line (PL5) can transmit power from the battery (510) to the integrated module (20A).

A fourth data line (DL4) may pass through the seventh hole (H7).

The battery (510) and the integrated module (20A) may communicate through the fourth data line (DL4).

Although not shown, a sixth data line may be disposed between the integration module (20A) and the communicating module (40).

The integrated module (20A) and the communicating module (40) may communicate through the sixth data line.

Meanwhile, the above has described a case in which data line (DL) for control signals, data communication, etc., and power line (PL) for power supply are separately provided, but the present invention may not be limited to this. For example, in the present invention, an integrated line (CL) can perform the functions of a data line (DL) and a power line (PL).

In this case, as shown in FIG. 39, the third interface (220) and the first power port (230) in the camera module (20) may be integrated into one integrated socket (220C).

The integrated socket (220C) can perform both the functions of the third interface (220) and the first power port (230).

In this case, the camera module (20) can receive power from the battery (510) through the integrated socket (220C).

The camera module (20) can receive a signal for controlling the camera module (20) from the driver (30) through the integrated socket (220C).

The camera module (20) can receive the vertical control signal and/or the horizontal control signal from the driver (30) through an integrated socket (220C).

In addition, the camera module (20) can transmit captured images to the driver (30) through the integrated socket (220C).

Looking at FIGS. 40 and 41, the case part (60) may include a tenth hole (H10) and an eleventh hole (H11).

A first integrated line (CL1) may be located between the driver (30) and the battery (510) within the case part (60).

The battery (510) can supply power to the driver (30) through the first integrated line (CL1).

In addition, the driver (30) and the battery (510) can perform data communication through the first integrated line (CL1).

The second integrated line (CL2) may pass through the tenth hole (H10).

The battery (510) can supply power to the camera module (20) through the first integrated line (CL1), driver (30), and second integrated line (CL2).

The driver (30) can communicate with the camera module (20) through the second integrated line (CL2).

Communication between the driver (30) and camera module (20) was previously described in detail.

The end of the second integrated line (CL2) may be connected to the integrated socket (220C) previously described in FIG. 39.

The third integrated line (CL3) may pass through the 11th hole (H11).

The battery (510) can supply power to the communicating module (40) through the first integrated line (CL1), driver (30), and third integrated line (CL3).

The driver (30) can communicate with the communicating module (40) through the third integrated line (CL3).

The communication between the driver (30) and the communicating module (40) has been previously described in detail.

When the driver (30) and the camera module (20) are integrated into one integrated module (20A), as shown in FIG. 42, the case part (60) may have a twelfth hole (H12).

Referring to FIG. 43, the fourth integrated line (CL4) may pass through the twelfth hole (H12).

The fourth integrated line (CL4) may be connected to the integrated socket (220C).

The integrated module (20A) can communicate with the battery (510) through the fourth integrated line (CL4).

The battery (510) can supply power to the integrated module (20A) through the fourth integrated line (CL4).

FIGS. 44 to 50 are diagrams to explain the setting mode of the potable counting apparatus according to the present invention. Hereinafter, descriptions of parts described in detail above may be omitted.

Looking at FIG. 44, the counting apparatus (1) can be installed in Setting Mode (S10).

The setting mode may be a mode for installing and setting the counting apparatus (1).

For example, a host user can install a counting apparatus (1) in a location corresponding to a shelter in a disaster situation.

Afterwards, the camera module (20) can be activated while the camera module (20) is installed on the mounting part (120) of the tripod (10) (S100).

The camera module (20) can capture surrounding images, that is, a setting image (STI), in an activated state (S110).

The image captured by the camera module (20) in the setting mode can be called the setting image (STI).

The setting image (STI) may include still images and/or moving images, such as photos.

The setting image (STI) can be transmitted to the server (2) (S120).

For example, when the camera module (20) captures a setting image (STI) in the setting mode, the driver (30) may control the communicating module (40) to transmit the setting image (STI) to the server (2).

Then, the server (2) can transmit the setting image (STI) to the host terminal (3) (S130). In addition, server (2) can store the setting image (STI) received from counting apparatus (1).

For example, assume that a first host user installs the first counting apparatus (1).

In this case, the server (2) obtains information in advance that the first counting apparatus (1) corresponds to the first host user, and connects the terminal of the first host user, that is, the first host terminal (3), to the first counting apparatus (1) can be matched.

Afterwards, the first counting apparatus (1) is activated to capture at least one setting image (STI) in the setting mode and transmit it to the server (2).

Then, the server (2) can transmit at least one setting image (STI) received from the first counting apparatus (1) to the first host terminal (3) corresponding to the first counting apparatus (1).

The host terminal (3), which has received the setting image (STI) from server (2), can determine whether setting completion information is input (S140).

If the determination result in step S140 is that the setup completion information is not input, the setup menu can be displayed on the screen of the host terminal (3) (S160).

Afterwards, when the host user inputs the setting information (S170), the host terminal (3) can transmit the entered setting information to the server (2) (S180).

Then, the server (2) can transmit the setting information received from the host terminal (3) to the counting apparatus (1) (S181).

Afterwards, the counting apparatus (1), which has received the setting information from the server (2), can adjust the mounting part (120) in response to the received setting information (S190).

Here, adjusting the mounting part (120) may correspond to adjusting the shooting angle of the camera module (20) disposed on the mounting part (120).

In the step of adjusting the mounting part (120), as shown in FIG. 45, the driver (30) in the counting apparatus (1) that receives the setting information from the server (2) can generate a control signal corresponding to the setting information (S191).

Afterwards, the driver (30) can transmit the generated control signals to the camera module (20) (S192).

Then, the camera module (20) can transmit the control signal received from the driver (30) to the tripod (10) (S193).

In detail, the camera module (20) may transmits the control signal received from the driver (30) to the angle adjustment motor (132) of the angle adjuster (130) of the tripod (10) and/or the rotation motor (142) of the rotator (140) (S193).

Here, the control signal may include a vertical control signal and/or a horizontal control signal.

Let us assume that in setting mode, the camera module (20) captures the setting image (STI) as shown in FIG. 46.

The setting image (STI) may be an image corresponding to an available shelter in a disaster situation.

This setting image (STI) is transmitted from the counting apparatus (1) to the server (2), and the server (2) can transmit the setting image (STI) received from the counting apparatus (1) to the host terminal (3).

Then, the setting image (STI) as shown in FIG. 46 can be displayed on the screen of the host terminal (3).

In addition, a menu for completing settings and a menu for changing settings may be displayed on the screen of the host terminal (3).

When the host user selects a menu to complete the settings, the process may proceed to step S150.

On the other hand, when the host user selects a menu to change settings, as shown in FIG. 47, a settings menu for entering setting information may be displayed on the screen of the host terminal (3).

The host user uses the setting menu displayed on the screen of the host terminal (3) to provide information for adjusting the vertical shooting angle and/or horizontal shooting angle of the camera module (20), that is, setting information using an input device.

Then, the host terminal (3) can transmit setting information to the server (2).

The setting information can also be said to be information for adjusting the shooting area (SAR) of the camera module (20).

Then, the server (2) can transmit the setting information received from the host terminal (3) to the counting apparatus (1).

The counting apparatus (1) generates the vertical control signal and/or the horizontal control signal in response to the setting information, and can adjust the vertical and/or horizontal shooting angle of the camera module (20).

For example, as shown in FIG. 48, the vertical shooting angle and/or the horizontal shooting angle of the camera module (20) can be adjusted to move the shooting area (SAR) of the camera module (20) in the direction of the arrow.

The configuration for changing (adjusting) the vertical shooting angle and/or horizontal shooting angle of the camera module (20) has been described in detail in FIGS. 5 to 8 and the corresponding detailed description.

Afterwards, the counting apparatus (1) captures at least one setting image (STI) again (S110) with the vertical shooting angle and/or the horizontal shooting angle of the camera module (20) changed, and the captured setting image (STI) can be transmitted to the server (2 (S120).

For example, the camera module (20) may capture a setting image (STI) as shown in FIG. 49 in response to the changed capture area (SAR), transmit it to the server (2), and proceed to step S130.

Meanwhile, as a result of determination in step S140, if setup completion information is input, the host terminal (3) can transmit the setup completion information to the server (2) (S150).

The host user can set the region of interest (ROI) using setting image (STI) in the host terminal (3).

The host terminal (3) can transmit information about the region of interest (ROI), that is, information about the settings of the region of interest (ROI), to the server (2).

Afterwards, server (2) can transmit information about region of interest (ROI) to the counting apparatus (1).

Then, the counting apparatus (1) can store information about the region of interest (ROI) in the memory unit (350) and use it.

After the region of interest (ROI) is set, the server (2) can exit setting mode (S210).

For example, the setting image (STI) as shown in FIG. 49 may be transmitted from the server (2) to the host terminal (3).

In this case, the host user may determine that the setting image (STI) displayed on the screen of the host terminal (3) is appropriate for counting the number of objects corresponding to the shelter and enter the setting completion information.

In addition, the host user can set the region of interest (ROI) in the setting image (STI) using the host terminal (3), as shown in FIG. 50.

The region of interest (ROI) can correspond to the space in a shelter where objects such as people and vehicles are mainly located.

Alternatively, the region of interest (ROI) may correspond to the entrance or exit of the shelter.

In FIG. 50, the region of interest (ROI) is shown to mainly correspond to the parking lot of the shelter, but the region of interest (ROI) can correspond to any space where the number of objects located in the shelter can be effectively counted.

After setting the region of interest (ROI), you can exit setting mode and then enter counting mode depending on your selection.

Below, a counting mode will be described in detail.

The counting mode can be said to be a mode in which the counting apparatus (1) captures images, analyzes the captured images, and counts the number of objects located in the region of interest (ROI).

FIGS. 51 to 56 are diagrams for explaining the counting mode and parts related thereto of the potable counting apparatus according to the present invention. Hereinafter, descriptions of parts described in detail above may be omitted.

Looking at FIG. 51, after the host terminal (3) transmits the setting completion information for the shooting area of the camera module (20) included in the counting apparatus (1) to the server (2) in response to the setting image (STI), the counting apparatus (1) may exit the setting mode (S210) and enter the counting mode (S300).

In the state of entering the counting mode, the camera module (20) of the counting apparatus (1) can capture the main image (MAI) (S310).

Here, the image captured by the camera module (20) in counting mode can be referred to as the main image (MAI).

The main image (MAI) may be approximately the same as the setting image (STI) finally captured in setting mode.

The main image (MAI) may include still images and/or moving images, such as photos.

The main image (MAI) captured by the camera module (20) can be transmitted to the driver (30).

Then, the driver (30) can analyze the main image (MAI) (S320) and determine the type of object corresponding to the region of interest (ROI) based on the analysis results (S330).

For example, the driver (30) can determine the type of object, such as a person or vehicle, located in the shelter in response to the main image (MAI).

Afterwards, the driver (30) can count the number of objects corresponding to the region of interest (ROI) of the main image (MAI) based on the determined information (S340).

Afterwards, the counting apparatus (1) can transmit information about the number of objects counted by the driver (30) to the server (2) (S350).

Then, the server (2) can classify and store information about the number of objects received from counting apparatus (1) (S360).

Afterwards, the server (2) can determine whether there is an information request from the guest user's guest terminal (4) (S370).

As a result of the determination in step S370, if there is no information request from the guest terminal (4), the preset first function (Default 1) can be performed (S390).

Here, the first function may be an example of a function that waits until an information request is received from the guest terminal (4).

On the other hand, if an information request is received from the guest terminal (4) as a result of the determination in step S370, information on the number of objects in the shelter corresponding to the counting apparatus (1) can be transmitted to the guest terminal (4). (S380).

Assume that the counting system (10S) includes a first counting apparatus (1A), a second counting apparatus (1), and a third counting apparatus (IC) as counting apparatus.

The first counting apparatus (1A) can count the number of objects in response to the region of interest (ROI) of a shelter 1 and transmit information about the number of counted objects to the server (2).

The second counting apparatus (1B) can count the number of objects in response to the region of interest (ROI) of a shelter 2 and transmit information about the number of counted objects to the server (2).

In addition, the third counting apparatus (IC) can count the number of objects in response to the region of interest (ROI) of a shelter 3 and transmit information about the number of counted objects to the server (2).

In the server 2, based on the information received from the first counting apparatus (1A), the number of subjects currently corresponding to the shelter 1, for example, the number of people and the number of vehicles evacuating to the shelter 1, can be identified and stored.

In addition, the server 2 determines the number of subjects that can be added to the shelter 1, such as the number of people and the number of vehicles that the shelter 1 can additionally accommodate, based on the information received from the first counting apparatus (1A) and the pre-stored information.

The server (2) can perform the same function for the second counting apparatus (1B) and the third counting apparatus (IC).

In this state, a guest user can use the guest terminal (4) to connect to the server (2) and request information about each shelter.

Then, the server (2) can transmit information corresponding to at least one shelter to guest terminal (4).

There is a high possibility that the winds could be strong enough in a disaster situation.

Taking this into account, it may be desirable to consider the effect of wind in counting mode. This will be explained in detail below.

Looking at FIG. 51, when the camera module (20) of the counting apparatus (1) captures the main image (MAI) (S310) and transmits the captured main image (MAI) to the driver (30), the driver (30) can analyze the main image (MAI) (S320).

Afterwards, the driver (30) determines the region of interest in the main image (MAI) based on the analysis results (S400), and determines whether the region of interest (ROI) is included in the main image (MAI) based on the determined result (S410).

If, as a result of the determination in step S410, the region of interest (ROI) is not included in the main image (MAI), the driver (30) can determine the first time (S420).

Here, the first time may refer to the length of time during which the region of interest (ROI) is not included in the main image (MAI).

Afterwards, it can be determined whether the determined first time is longer than or equal to the preset first reference time (S430).

If the first time determined as a result of the determination in step S430 is greater than or equal to the preset first reference time, the driver (30) determines that an error has occurred in the current counting apparatus (1) and may report this to the server 2 (S440).

Then, information about abnormalities in the counting apparatus (1) can be transmitted to the host terminal (3) corresponding to the counting apparatus (1).

In this case, the host can automatically and easily recognize that a problem has occurred in the counting apparatus (1).

Let's assume a disaster situation such as a typhoon where the winds may be relatively strong.

In this case, as shown in FIG. 53, the tripod (10) may shake or vibrate due to wind while the camera module (20) is placed on the mounting part (120) at the upper end of the tripod (10).

Additionally, the camera module (20) may also shake.

Then, as shown in FIG. 54, a main image (MAI) that does not include a region of interest (ROI) can be captured.

If the situation in which the main image (MAI) does not include a region of interest (ROI) persists for more than a preset first reference time (e.g., 30 seconds, 1 minute, 2 minutes, etc.), there may be a high possibility that an accident occurred, such as the tripod (10) falling or tilting.

In this case, the counting apparatus (1) can notify the server (2) that a problem has occurred in the counting apparatus (1), and the server (2) can notify the host terminal (3) that a problem has occurred in the counting apparatus (1).

Meanwhile, if the determined time as a result of the determination in step S430 is less than the preset first reference time, the process can proceed to step S410 of determining whether the main image (MAI) includes the region of interest (ROI).

Meanwhile, in step S410, if the main image (MAI) includes the region of interest (ROI), it can be determined whether the entire region of interest (ROI) is included in the main image (MAI) (S450).

If, as a result of the determination in step S450, the entire region of interest (ROI) is included in the main image (MAI), the driver (30) may determine that the current state of the counting apparatus (1) is normal (S500).

Afterwards, you can proceed to the step (S330) of determining the object in response to the region of interest (ROI) of the main image (MAI).

Meanwhile, if the determination in step S450 is that the main image (MAI) does not include the entire region of interest (ROI), the driver (30) can determines the ratio of the region of interest (ROI) included in the main image (MAI) (S460).

Meanwhile, if the determination in step S450 is that the main image (MAI) does not include the entire region of interest (ROI), the driver (30) determines the ratio of the region of interest (ROI) included in the main image (MAI) (S460).

Afterwards, the driver (30) can determine whether the ratio of the region of interest (ROI) included in the main image (MAI) changes over time (S470).

In step S470, if the ratio of the region of interest (ROI) included in the main image (MAI) changes over time, step S410 determining whether the region of interest (ROI) is included in the main image (MAI) is proceeded.

Assume that the camera module (20) is repeatedly shaken back and forth or left and right due to wind, etc.

In this case, the ratio of region of interest (ROI) included in the main image (MAI) may change.

For example, at the first timepoint, the main image (MAI) that does not include an image of the region of interest (ROI) may be captured, as shown in (A) of FIG. 55.

Thereafter, at the second timepoint, the camera module (20) is shaken and the main image (MAI) including a part of the region of interest (ROI) can be captured, as shown in (B) of FIG. 55.

Thereafter, at the third timepoint, the camera module (20) is shaken and the main image (MAI) including the entire region of interest (ROI) can be captured, as shown in (C) of FIG. 55.

Afterwards, at the fourth viewpoint, the camera module (20) is shaken and the main image (MAI) including part of the region of interest (ROI) can be captured again, as shown in (D) of FIG. 55.

In the case of FIG. 55, although the camera module (20) is shaking, the main image (MAI) including the entire region of interest (ROI) is periodically captured.

In this case, the tripod (10) is shaken left and right or back and forth due to wind, etc., but it is highly likely that the tripod (10) is not falling or tilting.

In addition, when the wind stops or becomes sufficiently weak, the shaking of the tripod (10) stops and the camera module (20) is more likely to continuously capture the main image (MAI) including the entire region of interest (ROI).

Considering this, when a main image (MAI) that periodically includes the entire region of interest (ROI) is captured, or when the main image (MAI) periodically includes the entire region of interest (ROI), the driver (30) can determine that the current state of the counting apparatus (1) is normal.

On the other hand, if the ratio of the region of interest (ROI) included in the main image (MAI) does not change over time as a result of the determination in step S470, the driver (30) can determine the second time (S480).

Here, the second time may refer to the length of time during which the ratio of the region of interest (ROI) included in the main image (MAI) remains unchanged.

Afterwards, it can be determined whether the determined second time is longer than or equal to the preset second reference time (S490).

If the second time determined as a result of the determination in step S490 is greater than or equal to the preset second reference time, the driver 30 determines that an error has occurred in the current counting apparatus 1 and may report this to the server 2 (S440).

Afterwards, it can be determined whether the determined second time is longer than or equal to the preset second reference time (S490).

If the second time determined as a result of the determination in step S490 is greater than or equal to the preset second reference time, the driver (30) determines that an error has occurred in the current counting apparatus (1) and may report this to the server (2) (S440).

On the other hand, if the second time determined as a result of the determination in step S490 is smaller than the preset second reference time, the step (S410) of determining whether the main image (MAI) includes the region of interest (ROI) may be performed.

For example, as shown in FIG. 56, a part of the region of interest (ROI) is included in the main image (MAI) and the ratio of the region of interest (ROI) included in the main image (MAI) is maintained constant.

If the situation persists for more than a preset second reference time (e.g., 30 seconds, 1 minute, 2 minutes, etc.), there may be a high possibility of an accident such as tripod (10) is fallen or tilted.

In this case, the counting apparatus (1) can notify the server (2) that a problem has occurred in the counting apparatus (1), and the server (2) can notify the host terminal (3) that a problem has occurred in the counting apparatus (1).

As described above, the present disclosure is described with reference to one embodiment shown in the drawings but is only an example, and it may be understood that various modifications and other equivalents may be performed by those skilled in the art.

Accordingly, a technical scope of the present disclosure should be determined by a technical spirit of the appended claims.

The invention claimed is:

1. A portable counting apparatus for smart city implementation using artificial intelligence, the apparatus comprising:
a tripod;
a camera module disposed on the tripod and takes images of a region of interest;
a driver configured to count a number of objects corresponding to the region of interest by analyzing the image of the region of interest;
a communicating module transmitting information of the number of the objects corresponding to the region of interest to a server;
a power supplying part supplying a power to at least one of the camera module, the driver and the communicating module; and
a case part,
wherein the power supplying part includes
a solar cell part producing power using solar energy; and
a battery storing the power produced by the solar cell part,
wherein the case part includes a space inside to accommodate at least one of the battery and the driver,
wherein the tripod includes
a pillar part including a portion extended along a vertical direction;
a mounting part located on a top of the pillar part; and
a plate part including a hole through which the pillar part passes;
wherein the camera module is disposed on the mounting part,
wherein the plate part is located below the mounting part,
wherein the communicating module is disposed on the plate part,
wherein the plate part includes
a first area which the hole is formed; and
a second area which the communicating module is disposed,
wherein a length of the plate part along a longitudinal direction is greater than a width of the plate part along a width direction,
wherein the first area and the second area are adjacent in the longitudinal direction,
wherein the first area is crossed with the second area,
wherein the hole is formed by penetrating the plate part in the vertical direction in the first area,
wherein the second area includes a portion which is extended in the vertical direction,
wherein the plate part further includes a first holder and a second holder,
wherein the communicating module is disposed between the first holder and the second holder.

2. The apparatus of claim 1, wherein the first holder and the second holder are adjacent in the vertical direction.

3. The apparatus of claim 2, wherein the communicating module is inserted between the first holder and the second holder in a sliding manner along the width direction.

4. The apparatus of claim 3, wherein the communicating module includes a first protrusion protruded toward the first holder and a second protrusion protruded toward the second holder.

5. A portable counting apparatus for smart city implementation using artificial intelligence, the apparatus comprising:
a tripod;
a camera module disposed on the tripod and takes images of a region of interest;

a driver configured to count a number of objects corresponding to the region of interest by analyzing the image of the region of interest;

a communicating module transmitting information of the number of the objects corresponding to the region of interest to a server;

a power supplying part supplying a power to at least one of the camera module, the driver and the communicating module; and a case part, wherein the power supplying part includes a solar cell part producing power using solar energy; and a battery storing the power produced by the solar cell part, wherein the case part includes a space inside to accommodate at least one of the battery and the driver, wherein the tripod includes a pillar part including a portion extended along a vertical direction;

a mounting part located on a top of the pillar part; and a plate part including a hole through which the pillar part passes;

wherein the camera module is disposed on the mounting part, wherein the plate part is located below the mounting part, wherein the communicating module is disposed on the plate part, wherein the case part includes a body part; and a cover part connected to the body part, wherein the body part includes a first side wall;

a second side wall opposite to the first side wall;

a front wall connected to one end of the first side wall and one end of the second side wall;

a rear wall opposite to the front wall and connected to the other end of the first side wall and the other end of the second side wall; and a bottom wall connected to the first side wall, the second side wall, the front wall and the rear wall, wherein the cover part is connected to the rear wall, wherein a handle is connected to the front wall, wherein a plurality of holes is formed on the first side wall, wherein no hole is formed on the second side wall, further comprising a first power line transmitting power produced in the solar cell part to the battery;

a second power line transmitting power from the battery to the camera module;

a third power line transmitting power from the battery to the communicating module;

a fourth power line transmitting power from the battery to the driver;

a first data line for communicating between the driver and the camera module; and a second data line for communicating between the driver and the communicating module, wherein the driver and the battery are disposed within the case part, wherein the first side wall includes a first hole through which the first power line passes;

a second hole through which the second power line passes;

a third hole through which the third power line passes;

a fourth hole through which the first data line passes; and a fifth hole through which the second data line passes, further including a hole cover disposed on the first side wall and covering the first hole, the second hole, the third hole, the fourth hole, and the fifth hole.

* * * * *